United States Patent
Wang et al.

(10) Patent No.: US 10,805,203 B2
(45) Date of Patent: Oct. 13, 2020

(54) MULTI-DOMAIN CONTROLLER, SINGLE-DOMAIN CONTROLLER, SOFTWARE DEFINED OPTICAL NETWORK SYSTEM AND METHOD

(71) Applicant: ZTE Corporation, Shenzhen, Guangdong (CN)

(72) Inventors: Dajiang Wang, Shenzhen (CN); Zhenyu Wang, Shenzhen (CN)

(73) Assignee: ZTE Corporation, Shenzhen (CN)

(*) Notice: Subject to any disclaimer, the term of this patent is extended or adjusted under 35 U.S.C. 154(b) by 313 days.

(21) Appl. No.: 15/572,884

(22) PCT Filed: Feb. 23, 2016

(86) PCT No.: PCT/CN2016/074383
§ 371 (c)(1),
(2) Date: Nov. 9, 2017

(87) PCT Pub. No.: WO2016/180068
PCT Pub. Date: Nov. 17, 2016

(65) Prior Publication Data
US 2018/0123945 A1    May 3, 2018

(30) Foreign Application Priority Data
May 11, 2015 (CN) .......................... 2015 1 0238117

(51) Int. Cl.
*H04L 12/715* (2013.01)
*H04J 14/02* (2006.01)
(Continued)

(52) U.S. Cl.
CPC .......... *H04L 45/04* (2013.01); *H04J 14/0227* (2013.01); *H04L 45/02* (2013.01);
(Continued)

(58) Field of Classification Search
CPC ......... H04L 45/04; H04L 45/02; H04L 45/42; H04L 45/64; H04L 47/70; H04L 45/12; H04J 14/0227
See application file for complete search history.

(56) References Cited

U.S. PATENT DOCUMENTS 7,197,546 B1 * 3/2007 Bagga ................. H04L 41/0856
370/469
8,045,481 B2 * 10/2011 Ong ........................ H04L 45/00
370/254
(Continued)

FOREIGN PATENT DOCUMENTS

CN    103051565 A    4/2013
CN    103338163 A    10/2013
(Continued)

OTHER PUBLICATIONS

Richard Vilalta et al., Dynamic Multi-Domain Virtual Optical Network Deployment With Heterogeneous Control Domains, Journal of Optical Communication Networks, Optical Society, vol. 7, No. 1, Jan. 2015, pp. 135-141. (Year: 2015).*
(Continued)

*Primary Examiner* — Patrice L Winder
(74) *Attorney, Agent, or Firm* — Wolf, Greenfield & Sacks, P.C.

(57) ABSTRACT

A multi-domain controller, a single-domain controller, a software defined optical network system and a method are disclosed. The multi-domain controller at least comprises a virtual network service manager arranged to: process a cross-domain or single-domain Virtual Optical Network Service (VONS) request sent from an application layer and divide the cross-domain VONS request into an inter-domain part to be processed and an intra-domain part to be processed, the intra-domain part including multiple intra-single-domain parts; the inter-domain part of the VONS request is
(Continued)

processed by a multi-domain controller, wherein the service request for a Bandwidth On Demand (BOD) connection attribute which is included in the cross-domain VONS request is forwarded by a routing connection controller, and an Optical Virtual Private Network (OVPN) service processing, which includes establishment and deletion, is performed on the service request for an OVPN attribute which is included in the cross-domain VONS request according to the virtual network layer resources acquired.

20 Claims, 12 Drawing Sheets

(51) Int. Cl.
*H04L 12/751* (2013.01)
*H04L 12/717* (2013.01)
*H04L 12/911* (2013.01)
*H04L 12/721* (2013.01)

(52) U.S. Cl.
CPC .............. *H04L 45/42* (2013.01); *H04L 45/64* (2013.01); *H04L 47/70* (2013.01); *H04L 45/12* (2013.01)

(56) References Cited

U.S. PATENT DOCUMENTS

| | | | |
|---|---|---|---|
| 8,296,824 B2 | 10/2012 | Johnson | |
| 8,375,424 B2 | 2/2013 | Lees | |
| 8,467,382 B1* | 6/2013 | Doverspike | H04B 10/03 370/355 |
| 8,559,334 B2* | 10/2013 | Iovanna | H04L 45/12 370/254 |
| 8,578,449 B2 | 11/2013 | Johnson | |
| 8,739,255 B2 | 5/2014 | Johnson | |
| 8,909,786 B2* | 12/2014 | Lee | H04L 67/1029 709/226 |
| 9,276,838 B2* | 3/2016 | Lee | H04L 45/64 |
| 9,450,864 B2* | 9/2016 | Zhao | H04L 45/42 |
| 9,621,968 B2* | 4/2017 | Syed | H04Q 11/0066 |
| 9,621,969 B2* | 4/2017 | Syed | H04L 41/0803 |
| 9,843,502 B2* | 12/2017 | Ubaldi | H04L 45/22 |
| 9,973,429 B2* | 5/2018 | Lee | H04L 47/10 |
| 10,291,515 B2* | 5/2019 | Zhang | H04L 45/302 |
| 10,411,911 B2* | 9/2019 | Li | H04L 41/044 |
| 2006/0282879 A1 | 12/2006 | Johnson | |
| 2006/0282881 A1 | 12/2006 | Johnson | |
| 2010/0162361 A1 | 6/2010 | Lees | |
| 2013/0013787 A1 | 1/2013 | Johnson | |
| 2014/0098673 A1 | 4/2014 | Lee et al. | |
| 2015/0341255 A1 | 11/2015 | Lu et al. | |
| 2018/0302316 A1* | 10/2018 | Ubaldi | H04L 45/70 |

FOREIGN PATENT DOCUMENTS

| | | |
|---|---|---|
| CN | 104301391 A | 1/2015 |
| CN | 104486194 A | 4/2015 |
| WO | 2012058911 A1 | 5/2012 |
| WO | 2013167051 A2 | 11/2013 |

OTHER PUBLICATIONS

International Search Report in international application No. PCT/CN2016/074383, dated May 13, 2016, 2 pages.
English Translation of the Written Opinion of the International Search Authority in international application No. PCT/CN2016/074383, dated May 13, 2016, 5pages.
Supplementary European Search Report in European application No. 16791918.2, dated Mar. 27, 2018, 11 pages.
Munoz Raul et al: "Transport Network Orchestration for End-to-End Multilayer Provisioning Across Heterogeneous SDN/Open Flow and GMPLS/PCE Control Domains" ,Journal of Lightwave Technology, IEEE Service Center, New York, NY, US,vol. 33, No. 8, Apr. 15, 2015 (Apr. 15, 2015), pp. 1540-1548, XP011575140.
Vilalta Ricard et al: "Dynamic multi-domain virtual optical network deployment with heterogeneous control domains [invited]" ,Journal of Optical Communications and Networking, Institute of Electrical and Electronics Engineers, US,vol. 7, No. 1, Jan. 1, 2015 (Jan. 1, 2015), XP011571358 , 8 pages.

* cited by examiner

MULTI-DOMAIN CONTROLLER, SINGLE-DOMAIN CONTROLLER, SOFTWARE DEFINED OPTICAL NETWORK SYSTEM AND METHOD

TECHNICAL FIELD

The disclosure relates to a controller technology used in a Software Defined Optical Network (SDON), and in particular to a multi-domain controller and a single-domain controller that can be realized in an SDON architecture system, the SDON architecture system, a message exchange configuration method used in the SDON architecture system, and a method for processing a service request of an application layer based on the SDON architecture system.

BACKGROUND

During the process of realizing the technical schemes of embodiments of the disclosure, the inventor finds at least the following technical problems:

optical fiber communications have mushroomed in the past decades, various nodes, systems and networking technologies emerge in endlessly, the rate of a single channel even reaches a grade of Tbit/s, and communication scale and communication capacity are increased unprecedentedly. Optical networks, as one of the most important telecommunication infrastructures in China, play a dominant role in supporting society informatization and broadband construction. In recent years, because the interactions among human, machines and things increase with each passing day, optical networks are required to be more dynamic and flexible, and for the reason of the variability and the abruptness of the services of optical networks, the requirements on an optical network management and control technology are more complicated. The development and the application of optical networks are not limited to the simple idea of 'rigid bandwidth pipe' any more, but show a trend and feature of flexible resource allocation and value added services.

For flexible resource allocation, the conventional wavelength-division multiplexing technology employs a fixed bandwidth resource allocation method according to which spectrum intervals, signal rate and modulation format cannot be dynamically adjusted because the bandwidth available for an optical layer cannot be adjusted dynamically once a wavelength path is established, thus, this fixed bandwidth resource allocation method cannot adapt to the change of services and network environment. Because the work speed of an optical sender/receiver and the cross bandwidth interval of an intermediate forwarding node are fixed, a network cannot increase or decrease the bandwidth occupied by an optical channel on demand to cope with the changing requirement of a user on capacity in real time. Meanwhile, the limitations to a fixed channel bandwidth are also unbeneficial to the survivability of an All Optical Network because an invalid optical path cannot be restored unless an alternate routing bandwidth is equal to or higher than the original bandwidth.

For value added services, the core of the solutions of the conventional intelligent optical networks represented by the conventional Automatic Switch Optical Network/Generalized Multi-protocol Label Switching (ASON/GMPLS) is switching automation Which places emphasis on the control over a connection establishment/deletion processing process and which includes automatic routing, signaling and link finding, resource management and so on. However, connections are not the same as services, the completion of a service further includes abundant service providing logic. The appearance of cloud computing and data center applications gives rise to a new challenge to virtualization and programmability and promotes the development of optical networks from control plane intellectualization towards service processing intellectualization. An ASON/GMPLS architecture has a problem of 'prefer control to service' and is therefore unlikely to be in line with this trend, and the construction of a network control function around a core of service intellectualization needs urgent innovation and breakthrough in system architecture and mechanisms.

The need for these two features may be met by extending existing An ASON/GMPLS technology. Because of the need of the introduction of new software and hardware technologies including service awareness, impairment verification, layer-domain cooperation, resource virtualization, Asymmetric Cryptographic (RSA) and Bandwidth On Demand (BOD), SON/GMPLS is more inclined to enhance the control over 'the increase of planes', making a network control function become more and more complicated. If some intellectuality can be peeled from a control plane, then the whole resource utilization rate can be increased, and services can be provided more flexibly.

The emergence of Software Defined Networking (SDN) provides an effective solution to this problem. The architecture of SDON realizes mode changes from the tight coupling between a control function and a transmission function to the tight coupling between a control function and an operating function, and from a closed control centered on a connection process to an opened control centered on a networking process, representing a new direction of the development and the application of future optical networking technologies.

The currently universal SDON system architecture mainly includes, as shown in FIG. 1, the following functional layers:

1: an application layer, which may specifically be an APP or a client controller layer through which a user can initiate a request for an operation (including establishment, deletion, modification and query) an OTN service connection;

2: a controller layer, which specifically includes a multi-domain controller layer and a single-domain controller layer;

1) the multi-domain controller layer, whose main functions include: computing a path for a cross-domain connection, managing connections, recovering protection, abstracting optical transmission resources, acquiring the topology information reported by each single-domain controller through a CVNI, and managing topology resources of a global area network;

2) the single-domain controller layer, which realizes, according to a service request sent by a multi-domain controller through a CVNI, an optimized intra-domain connection scheduling, wherein the scheduling includes intra-domain service connection path computing, connection management, protection recovery and so on, issues the optimized scheduling into the DXC and the OXC items on a node in a device layer through a CDPI (generally, an OpenFlow extension protocol), provides the topological information of intra-domain optical transmission resources to an upper multi-domain controller through the CVNI, and manages the topology resources in the current domain; and 3) a device layer, which acquires the item configuration sent by an upper-layer controller layer through the CDPI, and in which each device node realizes the service scheduling function thereof according to the DXC and OXC item record thereof.

As OTN applications get more popular, the requirement on 'the provision of Virtual Optical Network Service (VONS) by SDON' is becoming the focus of attention. VONS provides virtual optical network services for important clients/virtual operators using the network virtualization capability of SDON, as if the customer had his/her own private optical transmission network. A plurality of VONS users can share the physical optical transmission network of an operator, thus improving the utilization rate of network sources. The user request of a VONS service may include traffic matrix, SLA, network topology, OAM and recovery. According to the degree of the visibility of the user to the network resources of an operator and the capability of the user in controlling these network resources, VONS services may be classified into the following two types:

type 1: a dynamic connection service, that is, a BoD service, is provided according to the request of a user. Users can only see other subscribed network nodes and client-side interfaces and are visually shielded from the nodes and the links in the network of the operator, and users can establish, modify and delete a connection in a virtual network, as shown in FIG. 2; and type 2: the user determines the topology and the network resources of a virtual network by negotiating with the operator in advance, the user can completely control the establishment/modification/deletion of a connection in the virtual network, including the selection of a connection routing (e.g. the display of routings). Moreover, the user can adjust the topology of the virtual network, for example, add/delete a node or link, according to the service he/she needs, as shown in FIG. 3.

Virtual network resources can be allocated for users of these two types of VONS services in the following two ways:

way 1: the operator and the user determine the topology and the network resources of a virtual network through a pre-negotiation, and resources are allocated on a controller, in this mode, the user cannot modify the topology or network resources by using an APP; and way 2: the user applies for the topology and the network resources of a virtual network using an APP, and adjusts the topology of the virtual network, for example, adds/deletes a node or link, according to the service he/she needs.

In conclusion, how to design an architecture system, which in addition to the functions of existing architecture system, is compatible with the VONS in the SDON controller layer has become a technical problem that needs to be settled urgently, that is, a VONS system architecture needs to be integrated with and compatible with the existing SDON system architecture so as to make full use of the open mode of SDON control. Especially, the realization and the control of VONS services are the core of an SDON control architecture system.

SUMMARY

In view of this, embodiments of the disclosure are intended to provide a multi-domain controller, a single-domain control, an SDON architecture system and a method to at least address the problems existing currently by designing, in an SDON controller layer, an architecture system which, in addition to the functions of the existing architecture system, is compatible with the VONS.

The technical schemes of embodiments of the disclosure are as follows.

According to at least one embodiment of the disclosure, a multi-domain controller is provided, which at least includes: a virtual network service manager arranged to:

process a cross-domain or single-domain Virtual Optical Network Service (VONS) request sent from an application layer and divide the cross-domain VONS request into an inter-domain part to be processed and an intra-domain part to be processed, the intra-domain part including multiple intra-single-domain parts;

wherein the inter-domain part of the VONS request is processed by the multi-domain controller, wherein the multi-domain controller is arranged to: for a service request with a Bandwidth On Demand (BOD) connection attribute in the cross-domain VONS request, forward the service request with the BOD connection attribute to a routing connection controller, and for a service request with an Optical Virtual Private Network (OVPN) attribute in the cross-domain VONS request, perform OVPN service processing which includes establishment and deletion according to acquired virtual network layer resources; and wherein each of the intra-single-domain parts of the cross-domain VONS request is issued to each single-domain controller by the virtual network service manager of the multi-domain controller through a PCEP+/OPENFLOW/Restful/SNMP protocol controller.

According to at least one embodiment of the disclosure, a single-domain controller is provided, which at least includes: a virtual network service manager arranged to:

process a Virtual Optical Network Service (VONS) request in a current domain which is sent from a multi-domain controller, wherein for a service request with a Bandwidth On Demand (BOD) connection attribute in the VONS request in the current domain, the virtual network service manager is arranged to forward the service request with the BOD connection attribute to a routing connection controller, and for a service request with an Optical Virtual Private Network (OVPN) attribute in the VONS request in the current domain, perform OVPN service processing, which includes establishment and deletion, according to acquired virtual network layer resources.

According to at least one embodiment of the disclosure, an SDON is provided, which includes an application layer, a controller layer and a device layer, wherein the controller layer includes a multi-domain controller layer consisting of a multi-domain controller and a single-domain controller layer consisting of a single-domain controller;

the multi-domain controller includes any one of the foregoing multi-domain controllers; and/or the single-domain controller includes any one of the foregoing single-domain controllers.

According to at least one embodiment of the disclosure, a method for processing the service request of an application layer based on an SDON system is provided, wherein the method is realized based on an SDON which includes an application layer, a controller layer and a device layer, the controller layer includes a multi-domain controller layer consisting of a multi-domain controller and a single-domain controller layer consisting of a single-domain controller; the multi-domain controller includes any one of the foregoing multi-domain controllers; and/or the single-domain controller includes any one of the foregoing single-domain controllers.

The method includes that:

when the service request initiated by the application layer aiming at the multi-domain controller is an OVPN service establishment request, the virtual network service manager of the multi-domain controller determines whether or not the service request sent by the application layer is a cross-domain OVPN service request;

if the virtual network service manager of the multi-domain controller determines that the service request is a cross-domain OVPN service request, then the virtual network service manager of the multi-domain controller divides the cross-domain OVPN service request into an inter-domain part to be processed and an intra-domain part to be processed; and if the virtual network service manager of the multi-domain controller determines that the service request is not a cross-domain OVPN service request, then the PCEP+/OPENFLOW/Restful/SNMP protocol controller of the multi-domain controller issues the service request to the single-domain controller of each SDON.

According to at least one embodiment of the disclosure, a method for processing the service request of an application layer based on an SDON system is provided, wherein the method is realized based on an SDON which includes an application layer, a controller layer and a device layer, the controller layer includes a multi-domain controller layer consisting of a multi-domain controller and a single-domain controller layer consisting of a single-domain controller; the multi-domain controller includes the multi-domain controller claimed in any one of claims 1-12; and/or the single-domain controller includes the single-domain controller claimed in any one of claims 13-24.

The method includes that:

when the service request initiated by the application layer aiming at the multi-domain controller is an OVPN service deletion request, the virtual network service manager of the multi-domain controller determines whether or not the service request sent by the application layer is a cross-domain OVPN service request;

if the virtual network service manager of the multi-domain controller determines that the service request sent by the application layer is a cross-domain OVPN service request, then the virtual network service manager of the multi-domain controller divides the cross-domain OVPN service request into an inter-domain part to be processed and an intra-domain part to be processed; and if the virtual network service manager of the multi-domain controller determines that the service request is not a cross-domain OVPN service request, then the PCEP+/OPENFLOW/Restful/SNMP protocol controller of the multi-domain controller issues the service request to the single-domain controller of each SDON.

According to at least one embodiment of the disclosure, a method for processing the service request of an application layer based on an SDON system is provided, wherein the method is realized based on an SDON which includes an application layer, a controller layer and a device layer, the controller layer includes a multi-domain controller layer consisting of a multi-domain controller and a single-domain controller layer consisting of a single-domain controller; the multi-domain controller includes the multi-domain controller claimed in any one of claims 1-12; and/or the single-domain controller includes the single-domain controller claimed in any one of claims 12-24.

The method includes that:

when the service request initiated by the application layer aiming at the multi-domain controller is a BOD connection service establishment request, the virtual network service manager of the multi-domain controller determines whether or not the service request sent by the application layer is a BOD connection cross-domain service request;

if the virtual network service manager of the multi-domain controller determines that the service request sent by the application layer is a BOD connection cross-domain service request, the virtual network service manager of the multi-domain controller divides the BOD connection cross-domain service request into an inter-domain part to be processed and an intra-domain part to be processed; and if the virtual network service manager of the multi-domain controller determines that the service request is not a BOD connection cross-domain service request, then the PCEP+/OPENFLOW/Restful/SNMP protocol controller of the multi-domain controller issues the service request to the single-domain controller of each SDON.

According to at least one embodiment of the disclosure, a method for processing the service request of an application layer based on an SDON system is provided herein, wherein the method is realized based on an SDON which includes an application layer, a controller layer and a device layer, the controller layer includes a multi-domain controller layer consisting of a multi-domain controller and a single-domain controller layer consisting of a single-domain controller; the multi-domain controller includes the multi-domain controller claimed in any one of claims 1-12; and/or the single-domain controller includes the single-domain controller claimed in any one of claims 13-24.

The method includes that:

when the service request initiated by the application layer aiming at the multi-domain controller is a BOD connection service deletion request, the virtual network service manager of the multi-domain controller determines whether or not the service request sent by the application layer is a BOD connection cross-domain service request;

if the virtual network service manager of the multi-domain controller determines that the service request sent by the application layer is a BOD connection cross-domain service request, then the virtual network service manager of the multi-domain controller divides the BOD connection cross-domain service request into an inter-domain part to be processed and an intra-domain part to be processed; and if the virtual network service manager of the multi-domain controller determines that the service request is not a BOD connection cross-domain service request, then the PCEP+/OPENFLOW/Restful/SNMP protocol controller of the multi-domain controller issues the service request to the single-domain controller of each SDON.

According to at least one embodiment of the disclosure, the multi-domain controller provided herein at least includes: a virtual network service manager arranged to process a cross-domain or single-domain VONS request sent from an application layer and divide the cross-domain VONS request into an inter-domain part to be processed and an intra-domain part to be processed, the intra-domain part including multiple intra-single-domain parts, wherein the inter-domain part of the VONS request is processed by the multi-domain controller, wherein the multi-domain controller is arranged to: for a service request with a Bandwidth On Demand (BOD) connection attribute in the cross-domain VONS request, forward the service request with the BOD connection attribute to a routing connection controller, and for a service request with an Optical Virtual Private Network (OVPN) attribute in the cross-domain VONS request, perform OVPN service processing which includes establishment and deletion according to acquired virtual network layer resources; and wherein each of the intra-single-domain parts of the cross-domain VONS request is issued to each single-domain controller by the virtual network service manager of the multi-domain controller through a PCEP+/

OPENFLOW/Restful/SNMP protocol controller. Embodiments of the disclosure at least address the problems existing by designing, in an SDON controller layer, an architecture system which, in addition to the functions of existing architecture system, is compatible with the VONS.

DETAILED DESCRIPTION

Figure 1:
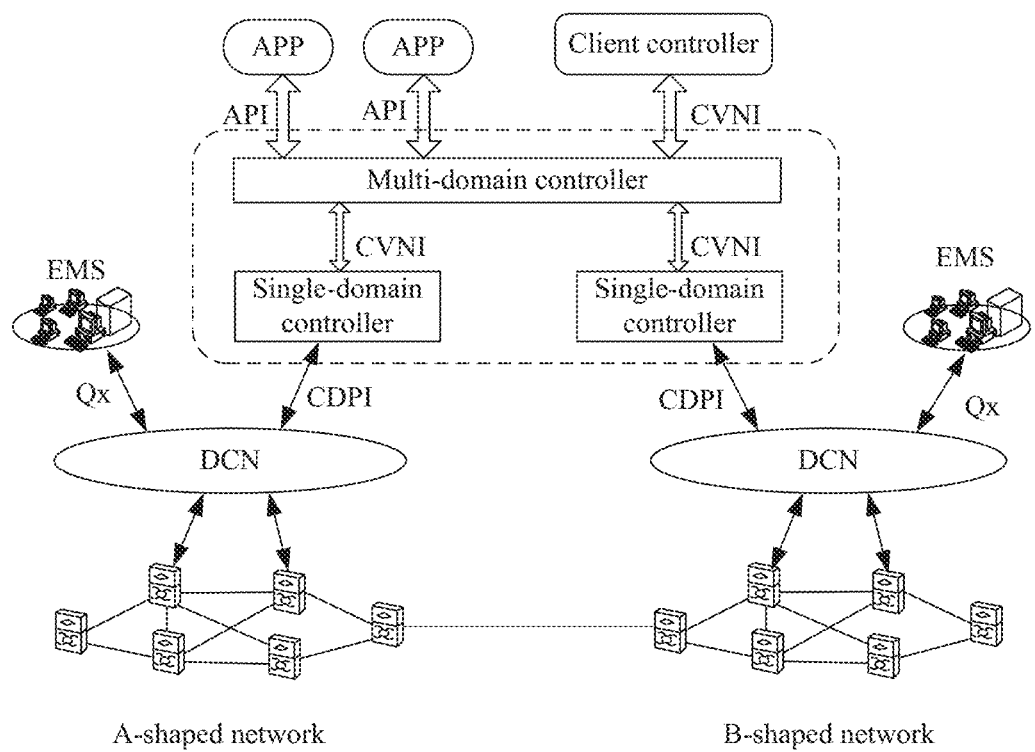
FIG. 1 is a schematic diagram illustrating an existing SDON system architecture.
Figure 2:
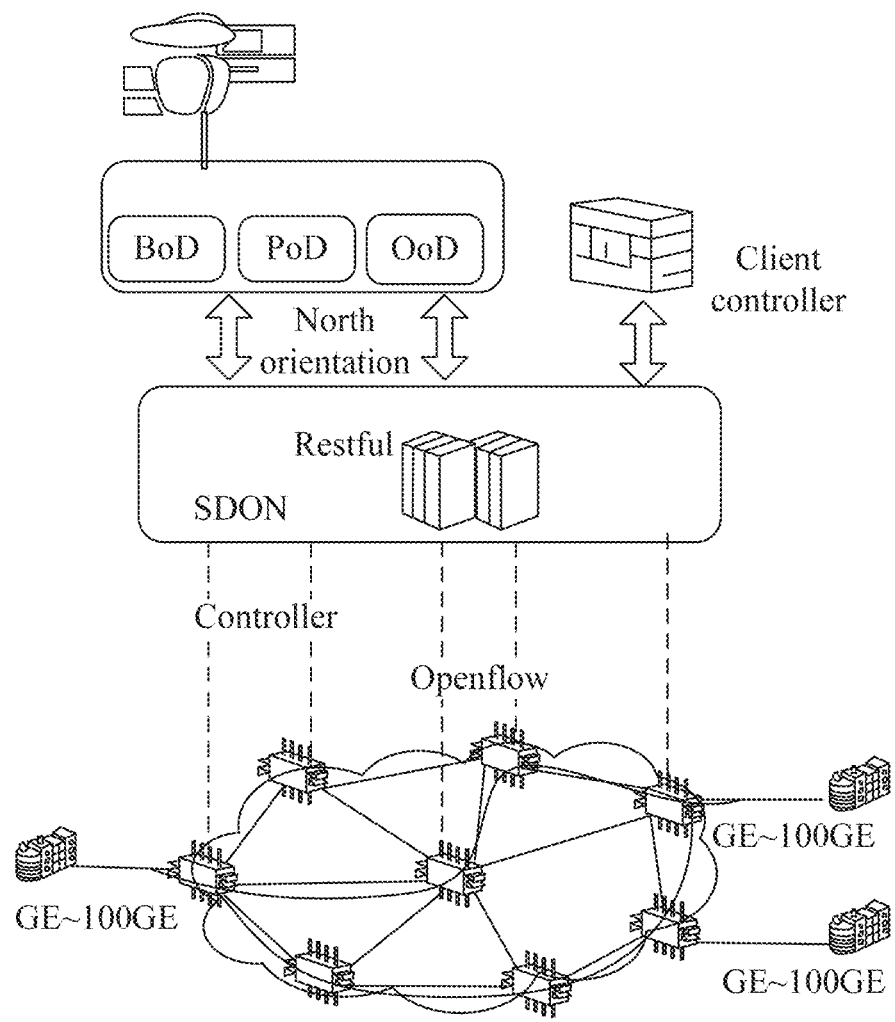
FIG. 2 is a schematic diagram illustrating BOD-type services of an existing VONS.
Figure 3:
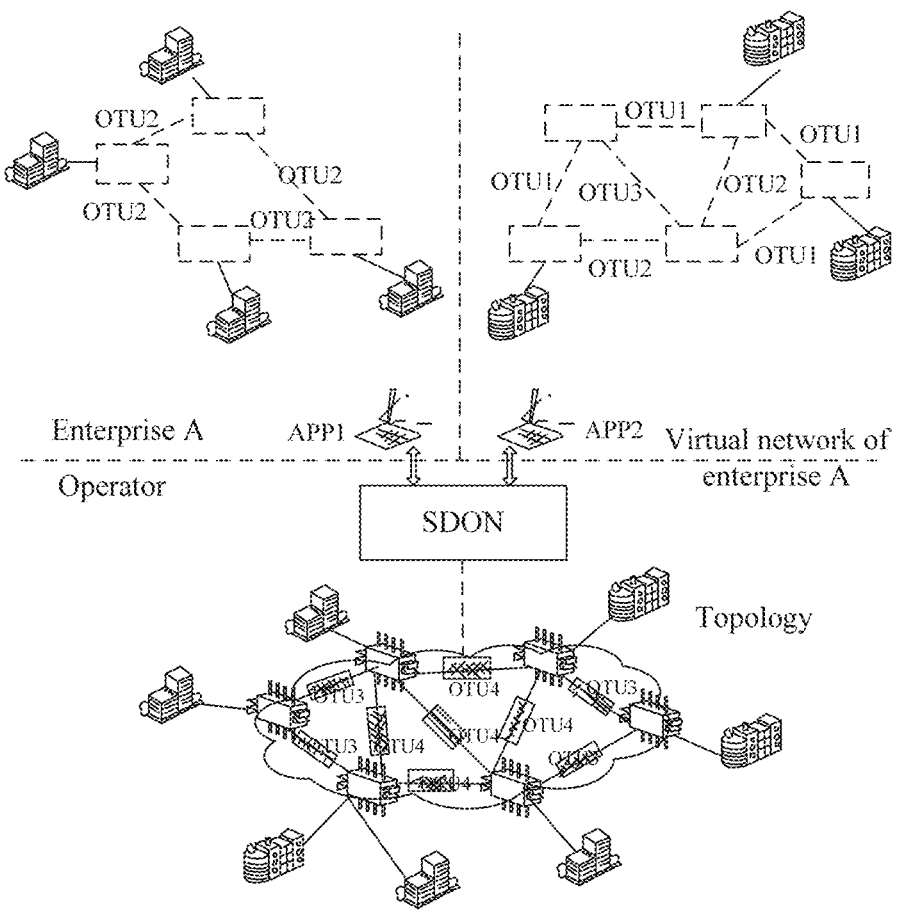
FIG. 3 is a schematic diagram illustrating OVPN-type services of an existing VONS.

The implementation of the technical schemes provided herein is described below in detail with reference to accompanying drawings.

Based on an example of a specific application scenario of the disclosure into which an SDN technology is introduced, an SDN technology and an OpenFlow architecture model can support the user in controlling a network function behavior through an OpenFlow, this provides an experimental approach to the research on supports for Internet innovation, and related contents of the scenario are described as follows:

1: in the aspect of thoughts on technical development: advantages of centralized and distributed control technologies are merged to realize a conversion from the focus on the intellectualization of network devices to the central provision of an intelligent control for an upper layer user in the form of Cloud;

2: in the aspect of device form, the separation of a control plane from a transmission plane is realized;

3: this scenario is programmable and therefore capable of adapting to control requirements on the uniformity, flexibility and integration of a network.

Under this background, the technical path of the next generation of optical networks which can be flexibly controlled by software, that is, SDON, is becoming the focus of attention in the field of optical network control technologies.

The architecture of an SDON realizes mode changes from the tight coupling between a control function and a transmission function to the tight coupling between a control function and an operating function, and from a closed control centered on a connection process to an opened control centered on a networking process, representing a new direction of the development and the application of future optical networking technologies.

Main advantages of SDON technologies are as follows:

1: this SDON scheme can effectively address the problem of the interworking among heterogeneous networks. Along with development of convergence networks, different types of services and network resources are interwoven and overlapped to form a heterogeneous internetworking environment, making it more difficult to control services and manage resources in the whole network. By extending related protocols such as OpenFlow, this scheme develops an object-oriented interaction control interface to realize the abstraction of heterogeneous network information and the integration of cross-layer network control, thus establishing, between an access network and a core network, between a data network and an optical network, and between a wired network and a wireless network, a new heterogeneous network architecture system having a uniform control capability.

2: SDON is capable of meeting the demand of the user on optical network orchestration, thus, network devices can be sold, used and operated flexibly, and the user can obtain a desired service function more quickly because the user does not have to wait for the operator to install these functions in dedicated product devices.

3: SDON brings a virtualization management on resources of an optical network, where the virtualization management can cover all OTN products, a network resource virtualization technology can exploit the advantages of network infrastructure resources to the full, and the utilization of network resources can be optimized by using an open uniform resource management platform. Based on a virtual network architecture, network resources can be quickly and effectively accessed and controlled according to the demands for the application of different services while the quality of services is guaranteed. By means of the idea of an SDN technology, each device manufacturer provides, by developing a universal interface supportive to the OpenFlow protocol, a uniformly opened control operation function for an upper-layer network, and a network controller virtualizes different types of devices using an abstraction algorithm and an abstraction strategy so as to support an overall planning on the resources in the whole network and a strategy scheduling. After the request of a user is received, resources are assigned to the user on demand and a real-time management is carried out through a virtualized resource scheduling.

In the foregoing application scenario, the technical demand that urgently needs to be met is the design of an architecture system which, in addition to the functions of existing architecture system, is compatible with a VONS in an SDON controller layer.

Embodiments of the disclosure are applied directing at this demand, and specifically, the SDON architecture system is a graded SDON controller architecture system which realizes VONS in a scenario in which there are a plurality of OTN network management domains.

To sum up, the disclosure is mainly applied to an SDON field and is mainly innovated in the following aspects: 1: the innovative design of an SDON controller system aiming at an optical network, wherein the multi-domain controller of an SDON takes charge of uniformly scheduling the cross-domain services of an optical network, an SDON single-domain controller takes charge of scheduling and controlling the services in a management domain for the devices of each manufacturer; 2: the realization of virtual network services using SDON graded controllers; 3: the clear definition of the types and the natures of virtual network services and the description of a service control flow; 4: the detailed description of the functions of the components in the multi-domain controller of the SDON and the single-domain controller of the SDON and the contents of the messages exchange between the components; 5: the description of the interfaces between SDON controllers and the contents of protocol messages; 6: creative components in the multi-domain controller and the single-domain controller and the clear definition of the functions of components including a routing connection controller, a connection table manager, a virtual network mapping strategy controller and a physical network abstraction controller; and 7: the design of a mechanism for two levels of mapping: that is, the mapping between an OVPN and a virtual network layer and that between the virtual network layer and a physical network layer.

Figure 4:
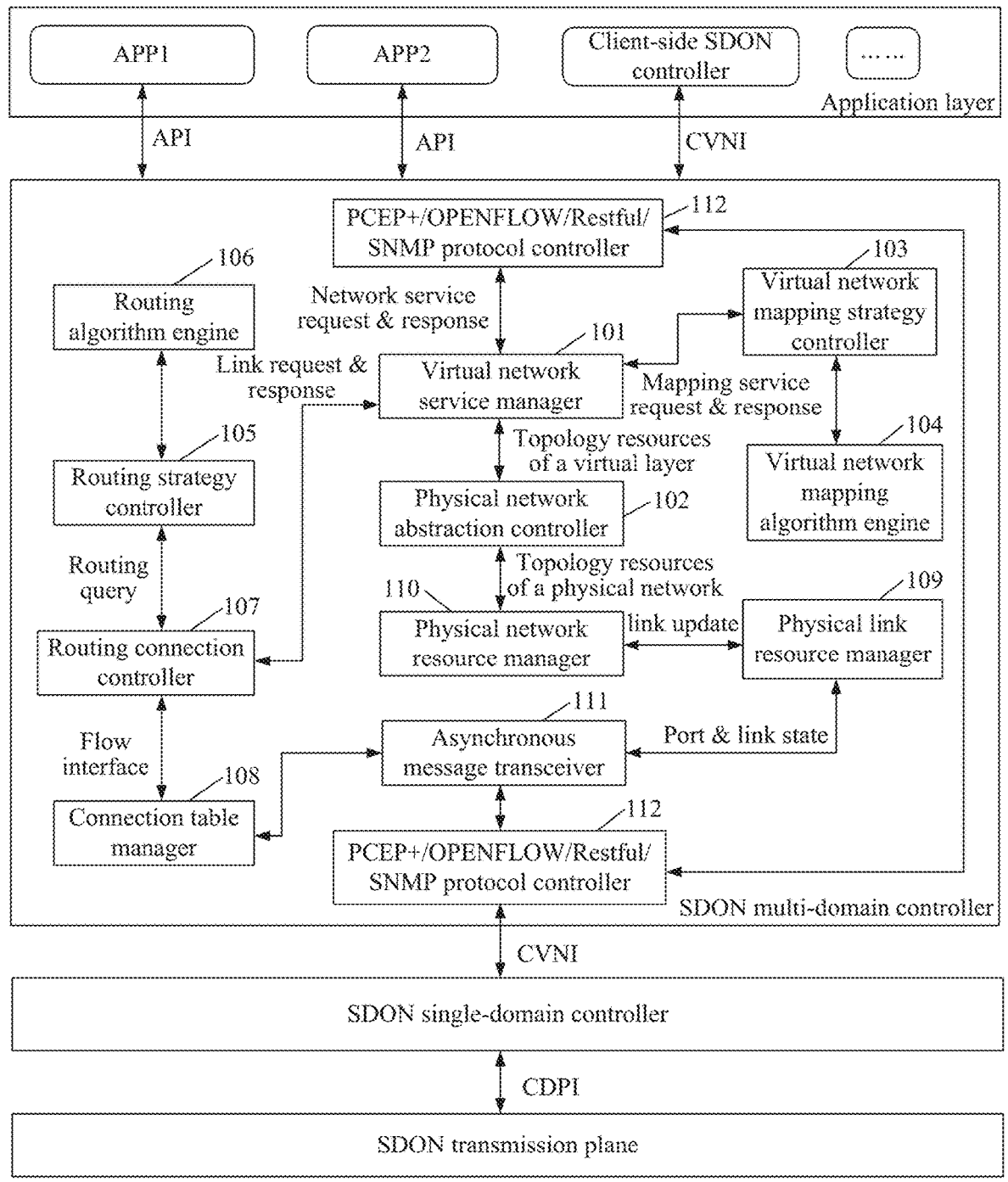
FIG. 4 is a functional diagram illustrating the multi-domain controller of an SDON architecture according to the disclosure.

Embodiment One: An Example of the Component Architecture of the Multi-Domain Controller of an SDON in an SDON Architecture System The SDON architecture system includes: an application layer, a controller layer and a device layer, wherein the controller layer includes a multi-domain controller layer and a single-domain controller layer, FIG. 4 shows an embodiment of the SDON architecture system, in the embodiment shown in FIG. 4, the functions of the components in the component architecture of the multi-domain controller of an SDON are described in detail as follows:

1. a virtual network service manager 101: the key component of the controller which has the following main functions:

1) processing a cross-domain or single-domain VONS request sent from an application layer user, dividing the cross-domain VONS request into two parts to be processed, that is, an inter-domain part to be processed and a single-domain part to be processed, the inter-domain part of the cross-domain VONS service is processed by a multi-domain controller: a service request for a BOD connection attribute is forwarded by a routing connection controller, and an OVPN service processing (including establishment and deletion), is performed on a service request for an OVPN attribute; and each intra-domain part of the cross-domain VONS service is issued to each single-domain controller by the virtual network service manager of the multi-domain controller through a PCEP+/OPENFLOW/Restful/SNMP protocol controller;

2) acquiring, aiming at a request for the inter-domain part of the cross-domain OVPN service, the mapping relationship between an OVPN and a cross-domain virtual network layer from a virtual network mapping strategy controller; the cross-domain physical network resources needed by the running of the inter-domain part of the cross-domain OVPN service are assigned through the cross-domain virtual network layer;

3) recording and storing the OVPN service information of each user and a connection service, for example, a cross-domain BOD, that is created by the user on an OVPN service or a connection service, for example, a cross-domain BOD, that is directly created by the user in the cross-domain virtual network layer, and the mapping relationship between the OVPN of each user and the cross-domain virtual network layer; and 4) acquiring the resources of the cross-domain virtual network layer from a physical network abstraction controller in real time and acquiring the mapping relationship between the cross-domain virtual network layer and a cross-domain physical network.

2. a physical network abstraction controller 102 having the following main functions of:

1) performing, in a cross-domain SDON transmission plane layer, a logical abstraction processing on physical models including the physical device nodes, the elements and the links of the boundary optical network of each domain to generate a cross-domain virtual network layer described in the form of a mathematic model such as a mathematical formula or a software language, this logical abstraction processing realizes a purpose of evading the complicated technical details of physical devices, simplifying the access and the operation of the user of the application layer and providing the user 'materials' of network resources that can be defined by being programmed. The cross-domain virtual network layer can be considered as the logically simplified cross-domain physical network layer of an SDON transmission plane or a mathematic model expression layer; and 2) creating and maintaining the topology of the cross-domain virtual network layer and a one-to-one (that is, 1:1) mapping relationship between the topology of the cross-domain virtual network layer and the cross-domain physical network layer of the SDON transmission plane.

3. a virtual network mapping strategy controller 103 having the following main functions of:

1) constructing the mathematic model (the target function, constraint conditions, input parameters and so on) of a mapping algorithm according to a virtual network mapping optimization strategy and sending a mapping computation request to a 'virtual network mapping algorithm engine', acquiring the mapping relationship between the inter-domain part of the OVPN service of the user and the cross-domain virtual network layer from a response received from the 'virtual network mapping algorithm engine', and finally transmitting the acquired mapping relationship to the virtual network service manager. It should be noted that because the mapping relationship between the topology of the cross-domain virtual network layer and the cross-domain physical network layer of the SDON transmission plane is a one-to-one correspondence relationship, the mapping relationship between the inter-domain part of the cross-domain OVPN service and the cross-domain virtual network layer is the mapping relationship between the inter-domain part of the cross-domain OVPN service and the cross-domain physical network layer of the SDON transmission plane;

2) determining a network mapping strategy for the inter-domain part of the cross-domain OVPN service and the cross-domain virtual network layer according to the distribution of the an application layer user or using the virtual network service manager according to the current load state of the cross-domain physical optical network of the SDON transmission plane layer; and 3) recording a virtual network mapping optimization strategy which generally includes: the minimal physical resource utilization cost, the most mapped OVPNs, load balancing and the maximum revenue, wherein a mapping strategy including 'resource convergence' and 'resource partitioning' may also be made if needed by the user. The 'resource convergence' refers to the convergence of a plurality of interconnected OTN physical links into a virtual link or a plurality of interconnected independent OTN physical nodes into a virtual node. The 'resource partitioning' refers to the partitioning of an OTN physical link resource into a plurality of independent virtual links each of which has the same function with an actual physical link or the abstractive partitioning of a single OTN physical node resource into a plurality of independent virtual nodes each of which has the same function with an actual physical node.

4. a virtual network mapping algorithm engine 104, which realizes, according to the virtual network mapping strategy, an algorithm for establishing a mapping relationship between the inter-domain part of the cross-domain OVPN service and the cross-domain virtual network layer. The algorithm engine supports algorithms including Mixed Integer Linear Programming (MILP), ant colony algorithms, heuristic algorithms and greedy algorithms.

5. a routing strategy controller 105, which takes charge of managing and controlling a constraint strategy and an optimization strategy which are used for computing the inter-domain path of a service connection including a cross-domain BOD. The constraint strategy for computing the inter-domain path of a service connection including a cross-domain BOD includes: the nodes or links that are strictly required not to be avoided, the nodes or links that are strictly required to be avoided, the nodes or links that are loosely required not to be avoided, and the nodes or links that are loosely required to be avoided. The optimization strategy for computing the inter-domain path of a service connection including a cross-domain BOD includes: the shortest path, the cost and the minimal cost.

6. a routing algorithm engine 106, which provides an RWA+IV path computing function for the inter-domain path of a service connection including a cross-domain BOD using algorithms including KSP, Dijkstra, MILP and First Fit.

7. a routing connection controller 107, which replaces the LDP/RSVP-TE module of the former MPLS-TE/GMPLS distributed control plane to control (including establishment, deletion, attribute modification and query) the inter-domain part of a service connection including a cross-domain BOD, wherein the control mainly involves generating and configuring each OXC/DXC node item included in the inter-domain part of each service connection including a BOD. Meanwhile, a protection recovery mechanism control is performed on the inter-domain part of each service connection including a BOD.

8. a connection table manager 108, which generates a corresponding OpenFlow item according to the OXC/DXC node cross configuration generated by the routing connection controller for the inter-domain part of each service connection including a BOD, transmits the generated OpenFlow item to the single-domain controller of each SDON through an asynchronous message transceiver, and finally issues the generated OpenFlow item to the domain boundary device node of a cross-domain SDON transmission plane using the single-domain controller of each SDON;

9. a physical link resource manager 109, which takes charge of collecting the physical links, nodes, ports and the other information reported by the domain boundary device node of the cross-domain SDON transmission plane and sends the collected information to a physical network resource manager;

10. a physical network resource manager 110, which receives the domain boundary links, nodes and ports and the other information sent by the physical link resource manager, and establishes, maintains and records the topology information of cross-domain physical optical network resources. Maintaining the topology information of a cross-domain optical network includes adding, deleting, querying and modifying a topology resource of the cross-domain optical network and identifying a fault;

11. an asynchronous message transceiver 111, which takes charge of caching and transmitting an asynchronous message transmitted between a multi-domain controller and a single-domain controller; and 12. a PCEP+/OPENFLOW/Restful/SNMP protocol controller 112, which takes charge of the protocol message exchange between the multi-domain controller and a single-domain controller and that between the multi-domain controller and an application layer user.

Besides, the multi-domain controller can request, according to a demand and the grade of a user service, each single-domain controller to report part of or all of the topology information of the internal virtual network layer of each single domain and summarize the topology information of the internal virtual network layer of each single domain and the topology information of the cross-domain virtual network layer of the multi-domain controller so as to uniformly control VONSs in the whole network.

Figure 5:
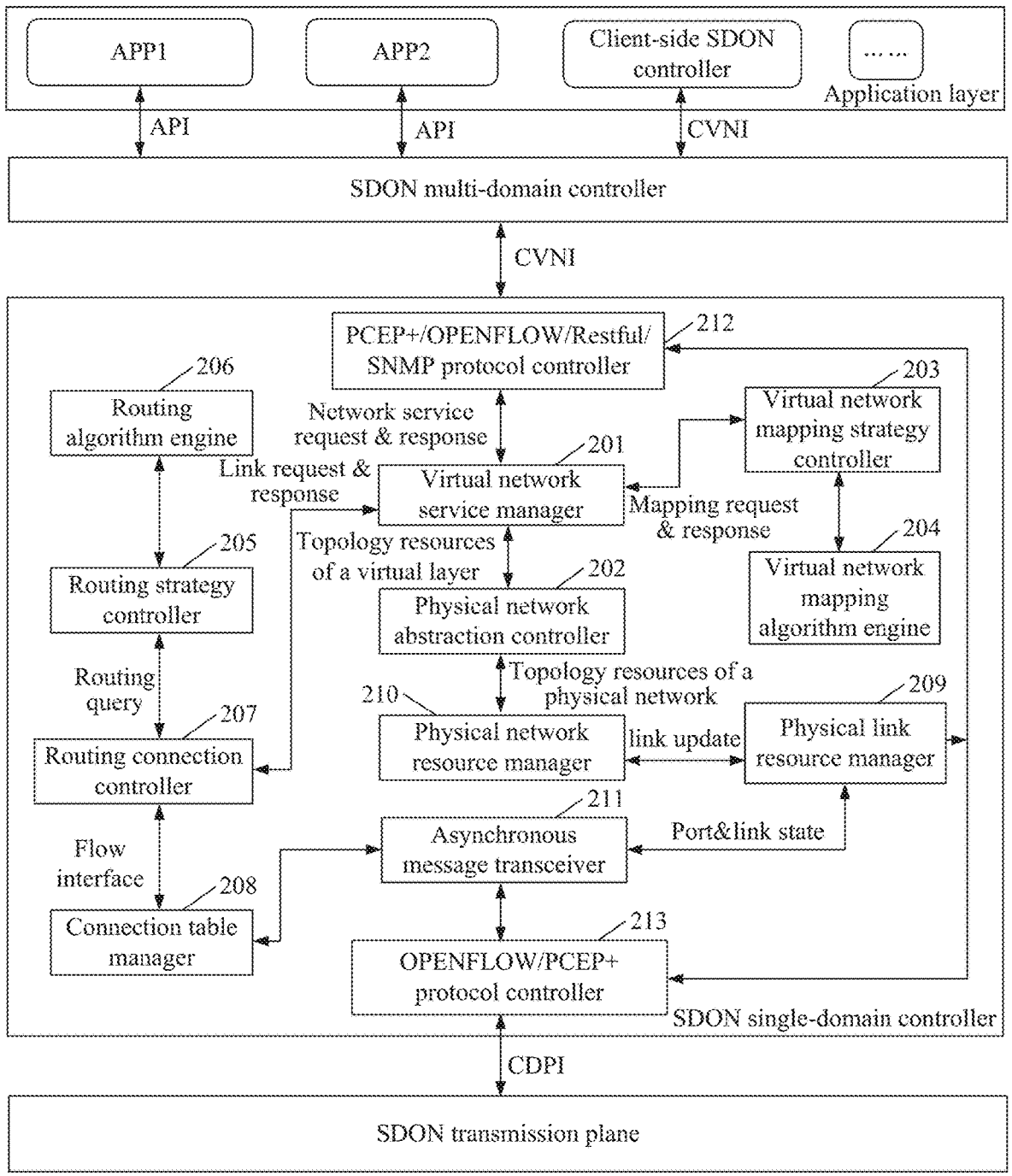
FIG. 5 is a functional diagram illustrating the single-domain controller of an SDON architecture according to the disclosure.

Embodiment Two: An Example of the Component Architecture of the Single-Domain Controller of an SDON in an SDON Architecture System The SDON architecture system includes: an application layer, a controller layer and a device layer, wherein the controller layer includes a multi-domain controller layer and a single-domain controller layer, FIG. 5 shows an embodiment of the SDON architecture system, in the embodiment shown in FIG. 5, the functions of the components in the component architecture of the single-domain controller of an SDON are described in detail as follows.

1. a virtual network service manager 201, the key component of the controller having the following main functions of:

1) processing a request for a virtual network service in the current domain which is sent from a multi-domain controller, wherein a service request for a BOD connection attribute is forwarded by a routing connection controller, and an OVPN service processing (including establishment and deletion) is performed on a service request for an OVPN attribute according to the virtual network layer resources acquired.

2) acquiring, according to the request for an OVPN service request in the current domain which is sent from the multi-domain controller, the mapping relationship between an OVPN and the virtual network layer of the current domain from a virtual network mapping controller; the physical network resources of the current domain that are needed by the running of the OVPN are assigned through a virtual network layer.

3) recording and storing the OVPN service information of each user and a connection service, for example, the BOD of the current domain, that is created by the user on an OVPN service or a connection service, for example, the BOD of the current domain, that is directly created by the user in the virtual network layer, and recording and storing the mapping relationship between the OVPN of each user and the virtual network layer of the current domain; and 4) acquiring the resources of the virtual network layer of the current domain from a physical network abstraction controller in real time and acquiring the mapping relationship between the virtual network layer of the current domain and the physical network of the current domain.

2. a physical network abstraction controller 202 having the following main functions of:

1) performing, in the SDON transmission plane layer of the current domain, a logical abstraction processing on physical models including the physical device nodes, the elements and the links of each optical network to generate a virtual network layer described in the form of a mathematic model such as a mathematical formula or a software language, the purpose of this logical abstraction processing is to realize a purpose of evading the complicated technical details of physical devices, simplifying the access and the operation of the user of an application layer and providing the user 'materials' of network resources that can be defined by being programmed. The virtual network layer can be considered as the logically simplified physical network layer of the SDON transmission plane or a mathematic model expression layer, and 2) creating and maintaining the topology of the virtual network layer of the current domain and a one-to-one (that is 1:1) mapping relationship between the virtual network layer of the current domain and the physical network layer of the SDON transmission plane of the current domain.

3. a virtual network mapping strategy controller 203 having the following main functions of:

1) constructing the mathematic model (the target function, constraint conditions, input parameters and so on) of a mapping algorithm according to a virtual network mapping optimization strategy and sending a mapping computation request to a 'virtual network mapping algorithm engine', acquiring the mapping relationship between the OVPN service of a user and the virtual network layer of the current domain from a response received from the 'virtual network mapping algorithm engine', and finally transmitting the acquired mapping relationship to the virtual network service manager. It should be noted that because the mapping relationship between the virtual network layer of the current domain and the physical network layer of the SDON transmission plane of the current domain is a one-to-tone correspondence relationship, the mapping relationship between an OVPN service and the virtual network layer of the current domain is the mapping relationship between the OVPN service and the physical network layer of the SDON transmission plane of the current domain;

2) determining a network mapping strategy for an OVPN service and the virtual network layer of the current domain according to the distribution of an application layer user or using a virtual network service manager according to the current load state of the physical optical network of the SDON transmission plane layer of the current domain; and 3) recording a virtual network mapping optimization strategy which generally includes: the minimal physical resource utilization cost, the most mapped OVPNs, load balancing and the maximum revenue, wherein a mapping strategy including 'resource convergence' and 'resource partitioning' may also be made if needed by the user. The 'resource convergence' refers to the convergence of a plurality of interconnected OTN physical links into a virtual link or a plurality of interconnected independent OTN physical nodes into a virtual node. The 'resource partitioning' refers to the partitioning of an OTN physical link resource into a plurality of independent virtual links each of which has the same function with an actual physical link or the abstractive partitioning of a single OTN physical node resource into a plurality of independent virtual nodes each of which has the same function with an actual physical node.

4. a virtual network mapping algorithm engine 204, which realizes, according to the virtual network mapping strategy, an algorithm for establishing a mapping relationship between an OVPN service and the virtual network layer of the current domain. The algorithm engine supports algorithms including MILP, ant colony algorithms and heuristic algorithms.

5. a routing strategy controller 205, which takes charge of managing and controlling a constraint strategy and an optimization strategy for computing the path of a service connection including an BOD in the current domain. The constraint strategy for a connection path includes: the nodes or links that are strictly required not to be avoided, the nodes or links that are strictly required to be avoided, the nodes or links that are loosely required not to be avoided, and the nodes or links that are loosely required to be avoided. The optimization strategy for a connection path includes: the shortest path, the cost and the minimal cost.

6. a routing algorithm engine 206, which provides an RWA+IV path computing function for the service connection including an BOD in the current domain using algorithms including KSP, Dijkstra, MILP and First Fit.

7. a routing connection controller 207, which replaces the LDP/RSVP-TE module of the former MPLS-TE/GMPLS distributed control plane to control (including establishment, deletion, attribute modification and query) a service connection including an end-to-end BOD in the current domain or the pail of a service connection including a multi-domain BOD that is in the current domain, wherein the control mainly involves configuring each OXC/DXC node item included on each service connection including a BOD. Meanwhile, a protection recovery mechanism control is performed on each service connection including a BOD.

8. a connection table manager 208, which generates a corresponding OpenFlow item according to the OXC/DXC node cross configuration of each service connection including a BOD that is generated by the routing connection controller and transmits the generated OpenFlow item to a device node of the SDON transmission plane through an asynchronous message transceiver.

9. a physical link resource manager 209, which takes charge of collecting the physical links, nodes, ports and the other information reported by the device node of the SDON transmission plane and sends the collected information to a physical network resource manager.

10. a physical network resource manager 210, which receives the physical links, nodes, ports and the other information reported by the physical link resource manager and establishes, maintains and records the topology information of physical optical network resources of the current domain. Maintaining the topology information of an optical network includes adding, deleting, querying and modifying the topology resources of the optical network and identifying a fault.

11. an asynchronous message transceiver 211, which takes charge of caching and transmitting an asynchronous message transmitted between a single-domain controller and a device node of the SDON transmission plane.

12. a PCEP+/OPENFLOW/Restful/SNMP protocol controller 212, which takes charge of the protocol message exchange between a multi-domain controller and a single-domain controller.

13. an OPENFLOW/PCEP+ protocol controller 213, which takes charge of controlling and transmitting a PCEP extension/OPENFLOW protocol used between a single-domain controller and a device node of the SDON transmission plane, establishes a connection session between a controller and an OTN device node, maintains the connection session, transfers a protocol message between the controller and the OTN device, and performs a security processing (e.g. message encryption and message decryption) on a message transmitted between the controller and an OTN physical node.

Embodiment Three: An Example of the Message Exchange Protocols Used in an SDON Architecture System 1. the contents of the messages exchanged between an application layer and a multi-domain controller are as follows:

a) a cross-domain VONS request and a response, wherein the request includes the establishment, the deletion, the attribute modification and the query of a cross-domain BOD service, an OPVN service and so on;

b) a single-domain VONS request and a response;

c) sessions and handshake messages of PCEP+/OPENFLOW/Restful/SNMP protocols;

d) the cross-domain virtual optical network layer topology information that is reported by the multi-domain controller, provided according to the grade of a user and opened restrictively; and e. the single-domain virtual optical network layer topology information that is reported by a multi-domain controller, provided according to the grade of a user and opened restrictively.

2. the contents of the messages exchanged between the multi-domain controller and a single-domain controller are as follows:

a) the single-domain virtual optical network layer topology information that is reported by the single-domain controller, provided according to the grade of a user and opened restrictively.

b) the inter-domain boundary physical nodes, links, ports and the other resource information reported by the single-domain controller;

c) a request sent by the multi-domain controller for an operation on the OpenFlow-based intra-domain boundary OXC and DXC items of a cross-domain OVNS service connection;

d) a response reported by the single-domain controller to the request for an operation on the OpenFlow-based intra-domain boundary OXC and DXC items of a cross-domain OVNS service connection;

e) a request sent by the multi-domain controller for an operation on a VONS service in a single domain;

f) a response sent by the single-domain controller to the request of the multi-domain controller for an operation on a VONS service in a single domain. According to the requirement of the multi-domain controller, the VONS service response may include the OpenFlow-based OXC and DXC item information of an OVNS service connection in a single domain and a response to an OVPN operation in a single domain; and g) sessions and handshake messages of PCEP+/OPENFLOW/Restful/SNMP protocols.

3. the contents of the messages exchanged between a single-domain controller and an SDON transmission plane are as follows:

a) the OpenFlow-based OXC and DXC item information of an OVNS service connection in a single domain that is issued by the single-domain controller;

b) the OpenFlow-based intra-domain boundary OXC and DXC item information of a cross-domain OVNS service connection which is issued by a multi-domain controller and forwarded by the single-domain controller;

c) the inter-domain boundary physical nodes, links, ports and the other resource information reported by the SDON transmission plane;

d) the single-domain internal physical nodes, links, ports and the other resource information reported by the SDON transmission plane; and e) sessions and handshake messages of PCEP+/OPENFLOW protocols.

4. the contents of the messages exchanged between the primary internal components of a multi-domain controller are as follows:

a) the following contents exchanged between a PCEP+/OPENFLOW/Restful/SNMP protocol controller and a virtual network service manager:

a cross-domain virtual network service request sent from an application layer to the multi-domain controller;

a cross-domain virtual network service response sent from the multi-domain controller to the application layer;

a single-domain virtual network service request sent from the application layer to the multi-domain controller;

a single-domain virtual network service response sent from the multi-domain controller to the application layer;

a request of the application layer for the provision of restrictively opened cross-domain virtual optical network layer topology information by the multi-domain controller according to the grade of a user;

the cross-domain virtual optical network layer topology information which is reported by the multi-domain controller to the application layer and restrictively opened according to the grade of a user;

a request of the application layer for the provision of restrictively opened single-domain virtual optical network layer topology information by the single-domain controller according to the grade of a user;

the single-domain virtual optical network layer topology information which is reported by the single-domain controller to the virtual network service manager of the multi-domain controller, provided according to the grade of a user and opened restrictively, wherein the topology information is reported to the application layer by the virtual network service manager of the multi-domain controller through a PCEP+/OPENFLOW/Restful/SNMP protocol controller.

b) the following contents exchanged between the virtual network service manager and a virtual network mapping strategy controller:

a request sent by the virtual network service manager for a mapping between the inter-domain part of the cross-domain OVPN service of a user and a cross-domain virtual network layer; and a response reported by the virtual network mapping strategy controller to the request for a mapping between the inter-domain part of the cross-domain OVPN service of a user and a cross-domain virtual network layer;

c) the following content exchanged between the virtual network service manager and a physical network abstraction controller:

the cross-domain virtual network layer resource topology information reported by the physical network abstraction controller;

d) the following content exchanged between the physical network abstraction controller and a physical network resource manager;

the cross-domain physical network resource topology information reported by the physical network resource manager;

e) the following content between the physical network resource manager and a physical link resource manager the domain boundary physical nodes, links, ports and the other resource information reported by the physical link resource manager;

f) the following contents exchanged between a routing connection controller and a connection table manager:

a request issued by the routing connection controller for the setting of the inter-domain OXC and DXC items of a service connection including a cross-domain BOD; and a response reported by the connection table manager to the request for the setting of the inter-domain OXC and DXC items of a service connection including a cross-domain BOD;

g) the following contents exchanged between a routing strategy controller and the routing connection controller:

a query request sent by the routing connection controller for the inter-domain routing of a service connection including a cross-domain BOD, wherein the information requested includes a cross-domain routing constraint strategy, a routing optimization strategy, the OVPN in which service connection such as a cross-domain BOD exists, the topology snapshot of the virtual network layer and so on;

a response reported by the routing strategy controller to the query request for the inter-domain routing of a service connection including a cross-domain BOD.

h) the following contents exchanged between a routing algorithm engine and the routing strategy controller:

a request sent by the routing strategy controller for the computation of the inter-domain routing of a service connection including a cross-domain BOD, wherein the computation includes the computation of an OVPN needed by service connection such as a cross-domain BOD, the topology snapshot of the virtual network layer and so on; and a response reported by the routing algorithm engine to the request for the computation of the inter-domain routing of a service connection including a cross-domain BOD;

i) the following contents exchanged between the virtual network service manager and the routing connection controller:

a request sent by the virtual network service manager for a control operation on the inter-domain part of a service connection including a cross-domain BOD, wherein the requested operation includes an operation on the OVPN needed for service connection such as a cross-domain BOD, an operation on the topology snapshot of the virtual network layer and so on; and a response reported by the routing connection controller to the request for a control operation on the inter-domain part of a service connection including a cross-domain BOD.

f) the following content exchanged between the connection table manager and an asynchronous message transceiver:

a request sent by the connection table manager for refreshing the inter-domain OXC and DXC items of a service connection including a cross-domain BOD; and a response reported by the asynchronous message transceiver to the request for refreshing the inter-domain OXC and DXC items of a service connection including a cross-domain BOD; and k) the following content exchanged between a physical link resource manager and the asynchronous message transceiver:

the domain boundary physical nodes, links, ports and the other resource information reported by the asynchronous message transceiver to the physical link resource manager.

5. the contents of the messages exchanged between the primary internal components of a single-domain controller:

a) the following contents exchanged between a PCEP+/OPENFLOW/Restful/SNMP protocol controller and a virtual network service manager:

a single-domain internal virtual network service request forwarded by the PCEP+/OPENFLOW/Restful/SNMP protocol controller to the single-domain controller;

a cross-domain virtual network service (the part in a single domain) request forwarded by the PCEP+/OPENFLOW/Restful/SNMP protocol controller to the single-domain controller;

a single-domain internal virtual network service response reported by the single-domain controller to the PCEP+/OPENFLOW/Restful/SNMP protocol controller;

a cross-domain virtual network service (the part in a single domain) response reported by the single-domain controller to the PCEP+/OPENFLOW/Restful/SNMP protocol controller;

a request forwarded by the PCEP+/OPENFLOW/Restful/SNMP protocol controller to the virtual network service manager to request the provision of restrictively opened single-domain virtual optical network layer topology information by the single-domain controller according to the grade of a user; and the single-domain virtual optical network layer topology information that is reported by the virtual network service manager, provided according to the grade of a user and opened restrictively;

b) the following contents exchanged between the virtual network service manager and a virtual network mapping strategy controller:

a request sent by the virtual network service manager for a mapping between the intra-domain part of the cross-domain OVPN service of a user or a single-domain OVPN service and a single-domain virtual network layer; and a response sent by the virtual network mapping strategy controller to the request for a mapping between the intra-domain part of the cross-domain OVPN service of a user or a single-domain OVPN service and a single-domain virtual network layer;

c) the following contents exchanged between the virtual network service manager and a physical network abstraction controller:

the single-domain virtual network layer resource topology information reported by the physical network abstraction controller;

d) the following content exchanged between the physical network abstraction controller and a physical network resource manager:

the single-domain physical network resource topology information reported by the physical network resource manager;

e) the following content between the physical network resource manager and a physical link resource manager:

the intra-domain physical nodes, links, ports and the other resource information reported by the physical link resource manager;

f) the following content exchanged between the physical link resource manager and a PCEP+/OPENFLOW/Restful/SNMP protocol controller:

the domain boundary physical nodes, links, ports and the other resource information reported by the physical link resource manager;

g) the following content exchanged between a routing connection controller and a connection table manager:

a request issued by the routing connection controller for the setting of the OXC and DXC items of the intra-domain part of a service connection including a cross-domain BOD;

a request issued by the routing connection controller for the setting of the OXC and XC items of a service connection including a single-domain BOD;

a response reported by the connection table manager to the request for the setting of the OXC and DXC items of the intra-domain part of a service connection including a cross-domain BOD; and a response reported by the connection table manager to the request for the setting of the OXC and DXC items of the intra-domain part of a service connection including a single-domain BOD;

h) the following contents exchanged between a routing strategy controller and the routing connection controller:

a query request sent by the routing connection controller for the routing of the intra-domain part of a service connection including a cross-domain BOD, wherein the requested information includes an intra-domain routing constraint strategy, a routing optimization strategy, the OVPN in which the intra-domain part of a service connection including a cross-domain BOD exists, the topology snapshot of the virtual network layer and so on;

a query request sent by the routing connection controller for the routing of a service connection including a single-domain BOD, wherein the requested information includes a single-domain routing constraint strategy, a routing optimization strategy, the OVPN in which the service connection including a single-domain BOD connection exists, the topology snapshot of the virtual network layer and so on;

a response reported by the routing strategy controller to the request for the query of the routing of a service connection including a single-domain BOD; and a response reported by the routing strategy controller to the request for the query of the routing of a service connection including a single-domain BOD;

i) the following contents exchanged between a routing algorithm engine and the routing strategy controller:

a request sent by the routing strategy controller for the computation of the routing of the intra-domain part of a service connection including a cross-domain BOD, wherein the computation includes the computation of an OVPN needed by service connection such as a cross-domain BOD, the topology snapshot of a virtual network layer and so on; and a request sent by the routing strategy controller for the computation of the routing of a service connection including a single-domain BOD, wherein the computation includes the computation of an OVPN needed by the service connection including a single-domain BOD connection and the topology snapshot of a virtual network layer and so on;

a response reported by the routing algorithm engine to the request for the computation of the routing of the intra-domain part of a service connection including a cross-domain BOD; and a response reported by the routing algorithm engine to the request for the computation of a service connection including a single-domain BOD;

j) the following contents exchanged between the virtual network service manager and a routing connection controller:

a request sent by the virtual network service manager for a control operation on the intra-domain part of a service connection including a cross-domain BOD, wherein the requested operation includes an operation on the OVPN needed for the intra-domain part of a service connection including a cross-domain BOD, an operation on the topology snapshot of the virtual network layer and so on; and a request sent by the virtual network service manager for a control operation on a service connection including a single-domain BOD, wherein the requested operation includes an operation on the OVPN needed for the service connection including a single-domain BOD connection, an operation on the topology snapshoot of the virtual network layer and so on;

a response reported by the routing connection controller to the request for a control operation on the intra-domain part of a service connection including a cross-domain BOD;

a response reported by the routing connection controller to the request for a control operation on a service connection including a single-domain BOD;

k) the following content exchanged between a connection table manager and an asynchronous message transceiver:

a request sent by the connection table manager for refreshing the OXC and DXC items of the intra-domain part of a service connection including a cross-domain BOD;

a request sent by the connection table manager for refreshing the OXC and DXC items of a service connection including a single-domain BOD;

a response to the request for refreshing the OXC and DXC items of the intra-domain part of a service connection including a cross-domain BOD that is reported by the asynchronous message transceiver to the connection table manager; and a response to the request for refreshing the OXC and DXC items of a service connection including a single-domain BOD that is reported by the asynchronous message transceiver to the connection table manager;

l) the following content exchanged between a physical link resource manager and an asynchronous message transceiver:

the physical nodes, links, ports and the other resource in the current domain that are reported by the asynchronous message transceiver to the physical link resource manager; and the domain boundary physical nodes, links, ports and the other resource information reported by the asynchronous message transceiver to the physical link resource manager; and m: the following contents exchanged between a PCEP+/OPENFLOW/Restful/SNMP protocol controller and an OPENFLOW/PCEP+ protocol controller:

a request sent by a multi-domain controller for refreshing the OXC and DXC items of the inter-domain part of a service connection including a cross-domain BOD; and a response to the request for refreshing the OXC and DXC items of the inter-domain part of a service connection including a cross-domain BOD which is reported by an SDON transmission plane to the multi-domain controller.

Figure 6:
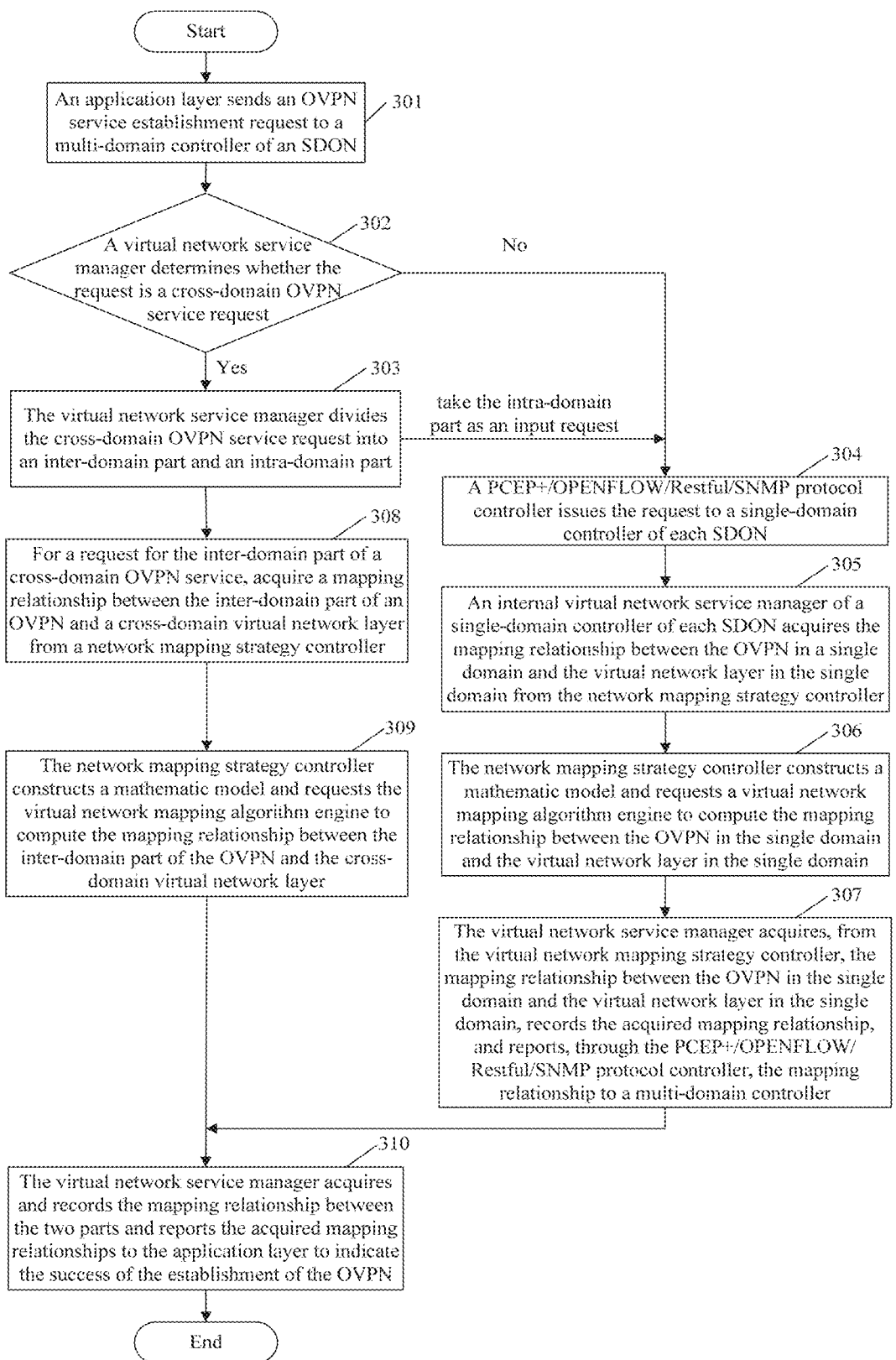
FIG. 6 is a flow chart illustrating the establishment of an OVPN service according to the disclosure.

Embodiment Four: Examples of the Processing of the Service Request of an Application Layer Based on an SDON Architecture System the basic flow of the realization of an SDON virtual optical network service mainly includes the control over services including OVPN and BOD and the abstraction of a virtual network layer, which are illustrated in the following different scenarios:

Scenario 1: in the SDON architecture system described herein, the establishment of an OVPN service includes, as shown in FIG. 6, the following steps.

In Step 301, an application layer sends an OVPN service establishment request to the multi-domain controller of an SDON.

In Step 302, the virtual network service manager of the multi-domain controller determines whether or not the request sent by the application layer is a cross-domain OVPN service request.

In Step 303, if it is determined in Step 302 that the request sent by the application layer is a cross-domain OVPN service request, then the virtual network service manager of the multi-domain controller divides the cross-domain OVPN service request into an inter-domain part to be processed and an intra-domain part to be processed, wherein each intra-domain part is sent to the single-domain controller of each SDON through the PCEP+/OPENFLOW/Restful/SNMP protocol controller of the multi-domain controller, and then the processing proceeds to Step 305; and for the inter-domain part, the processing directly proceeds to Step 308.

In Step 304, if it is determined in Step 302 that the request sent by the application layer is not a cross-domain OVPN service request, then the request is issued to the single-domain controller of each SDON through the PCEP+/OPENFLOW/Restful/SNMP protocol controller of the multi-domain controller.

In Step 305, the internal virtual network service manager of the single-domain controller of each SDON acquires the mapping relationship between the OVPN in a single domain and the virtual network layer in a single domain from a virtual network mapping strategy controller.

In Step 306, the virtual network mapping strategy controller of each single-domain constructs a mathematic model and requests a virtual network mapping algorithm engine to compute the mapping relationship between the OVPN in a single domain and the virtual network layer in a single domain.

In Step 307, the virtual network service manager of each single-domain acquires, from the virtual network mapping strategy controller, the mapping relationship between the OVPN in a single domain and the virtual network layer in a single domain, records the acquired mapping relationship, and reports, through a PCEP+/OPENFLOW/Restful/SNMP protocol controller, the mapping relationship to a multi-domain controller, and then the processing proceeds to Step 310.

In Step 308, the mapping relationship between the inter-domain part of an OVPN and a cross-domain virtual network layer is acquired from a multi-domain virtual network mapping strategy controller for a request for the inter-domain part of a cross-domain OVPN service.

In Step 309, the virtual network mapping strategy controller constructs a mathematic model and requests the virtual network mapping algorithm engine to compute the mapping relationship between the inter-domain part of the OVPN and the cross-domain virtual network layer. and In Step 310, the multi-domain virtual network service manager acquires the mapping relationship between each intra-domain part and the inter-domain part, records the acquired mapping relationship, and uniformly reports, after Step 309 is executed, the acquired mapping relationships to the application layer to indicate the success of the establishment of an OVPN.

Figure 7:
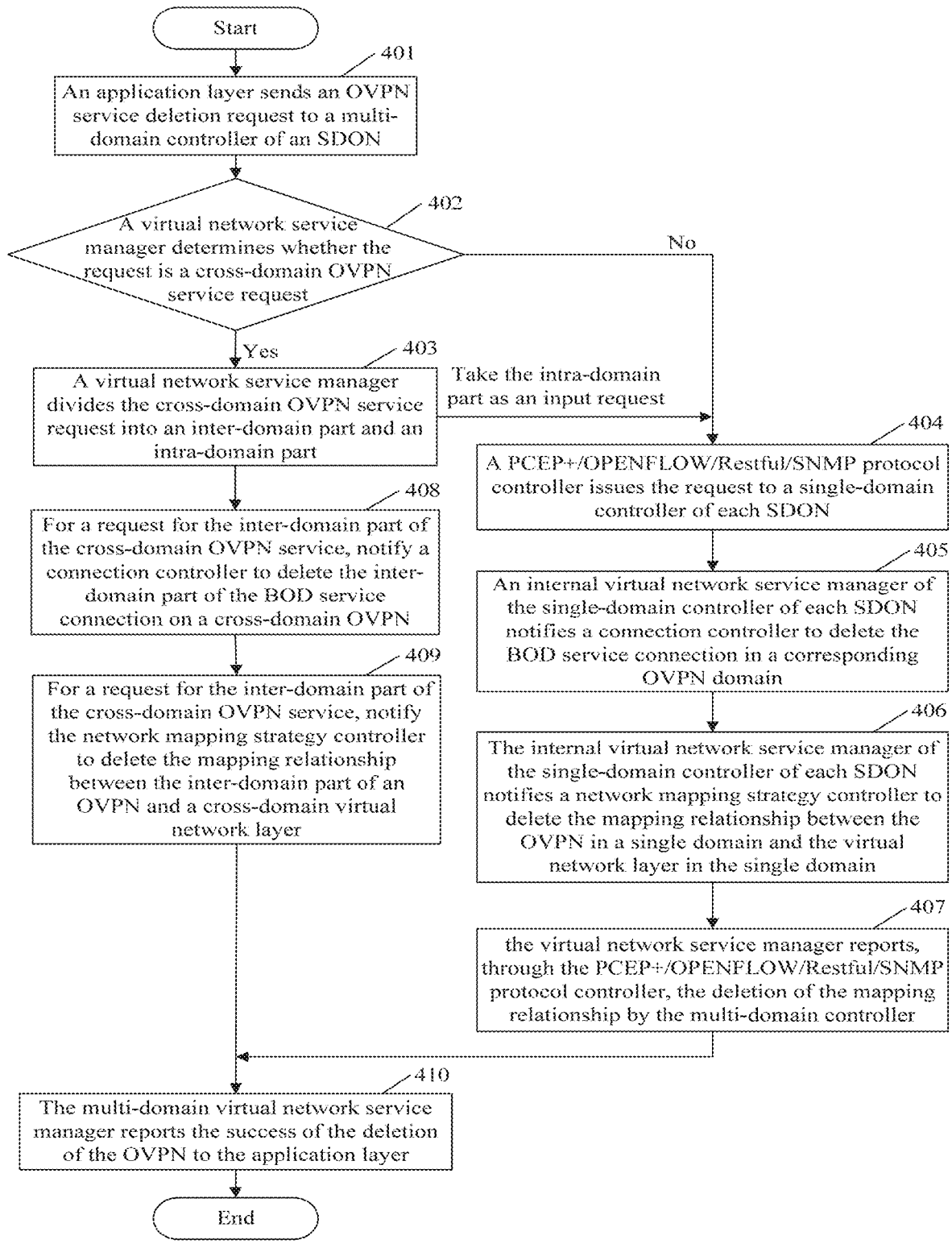
FIG. 7 is a flow chart illustrating the deletion of an OVPN according to the disclosure.

Scenario 2: in the SDON architecture system described herein, the deletion of an OVPN service includes, as shown in FIG. 7, the following steps.

In Step 401, an application layer sends an OVPN service deletion request to the multi-domain controller of an SDON.

In Step 402, the virtual network service manager of the multi-domain controller determines whether or not the request sent by the application layer is a cross-domain OVPN service request.

In Step 403, if it is determined in Step 402 that the request sent by the application layer is a cross-domain OVPN service request, then the virtual network service manager of the multi-domain controller divides the cross-domain OVPN service request into an inter-domain part to be processed and an intra-domain part to be processed, wherein each intra-domain part is sent to the single-domain controller of each SDON through the PCEP+/OPENFLOW/Restful/SNMP protocol controller of the multi-domain controller, and then the processing proceeds to Step 405, and for the inter-domain part, the processing directly proceeds to Step 408.

In Step 404, if it is determined in Step 402 that the request sent by the application layer is not a cross-domain OVPN service request, then the request is issued to the single-domain controller of each SDON through the PCEP+/OPENFLOW/Restful/SNMP protocol controller of the multi-domain controller.

In Step 405, the internal virtual network service manager of the single-domain controller of each SDON notifies a routing connection controller to delete a BOD service connection in a corresponding OVPN domain.

In Step 406, the internal virtual network service manager of the single-domain controller of each SDON notifies a virtual network mapping strategy controller to delete the mapping relationship between the OVPN in a single domain and the virtual network layer in a single domain.

In Step 407, the virtual network service manager reports, through a PCEP+/OPENFLOW/Restful/SNMP protocol controller, the deletion of the mapping relationship by the multi-domain controller, and the processing proceeds to Step 410.

In Step 408, for a request for the inter-domain part of the cross-domain OVPN service, the routing connection controller is notified to delete the inter-domain part of the BOD service connection on a cross-domain OVPN.

In Step 409, for a request for the inter-domain part of the cross-domain OVPN service, the virtual network mapping strategy controller is notified to delete the mapping relationship between the inter-domain part of an OVPN and a cross-domain virtual network layer.

In Step 410, after Step 409 is executed, the multi-domain virtual network service manager uniformly reports the success of the deletion of the OVPN to the application layer.

Figure 8A:
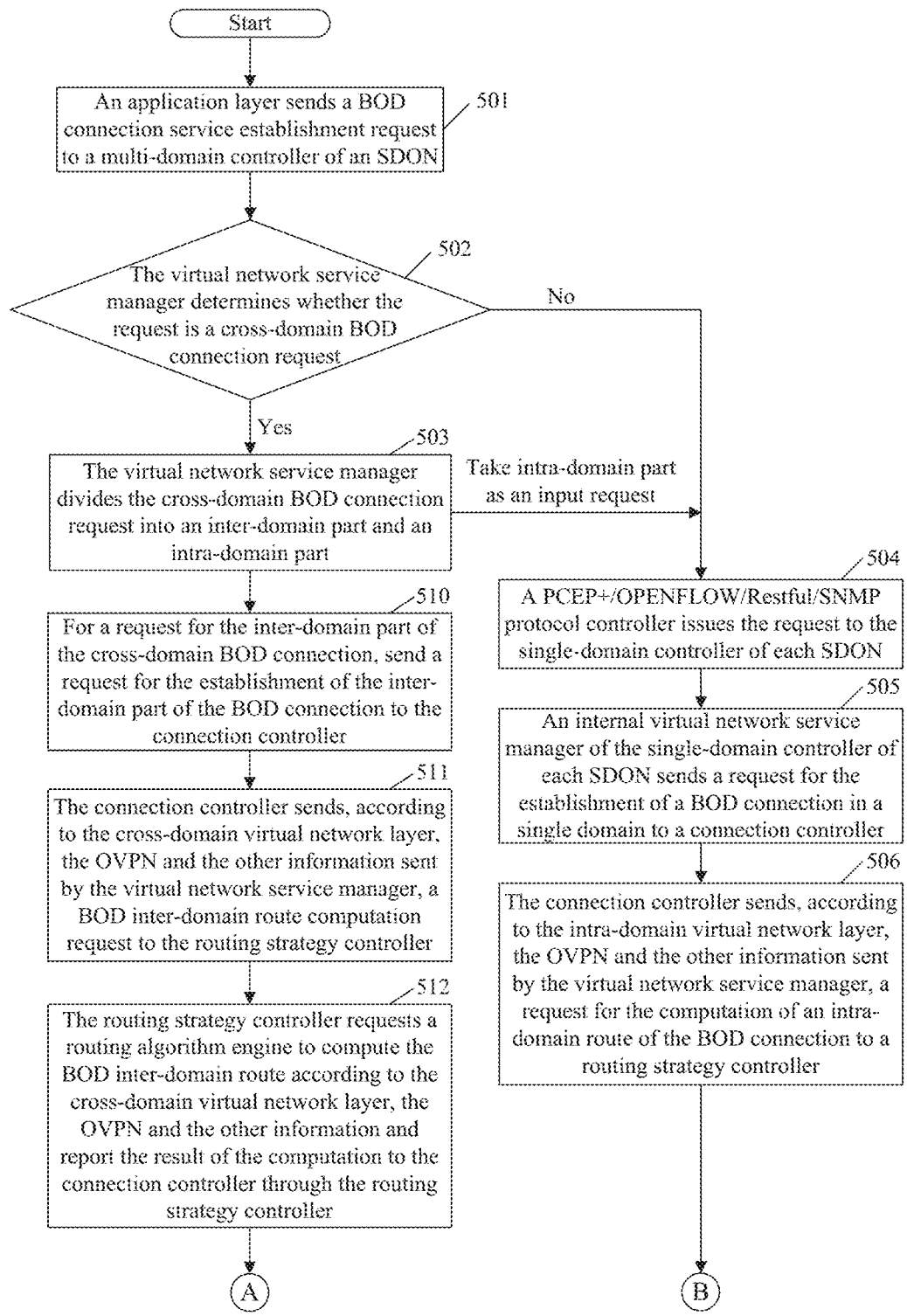
FIG. 8 is a flow chart illustrating the establishment of a BOD service according to the disclosure.
Figure 8B:
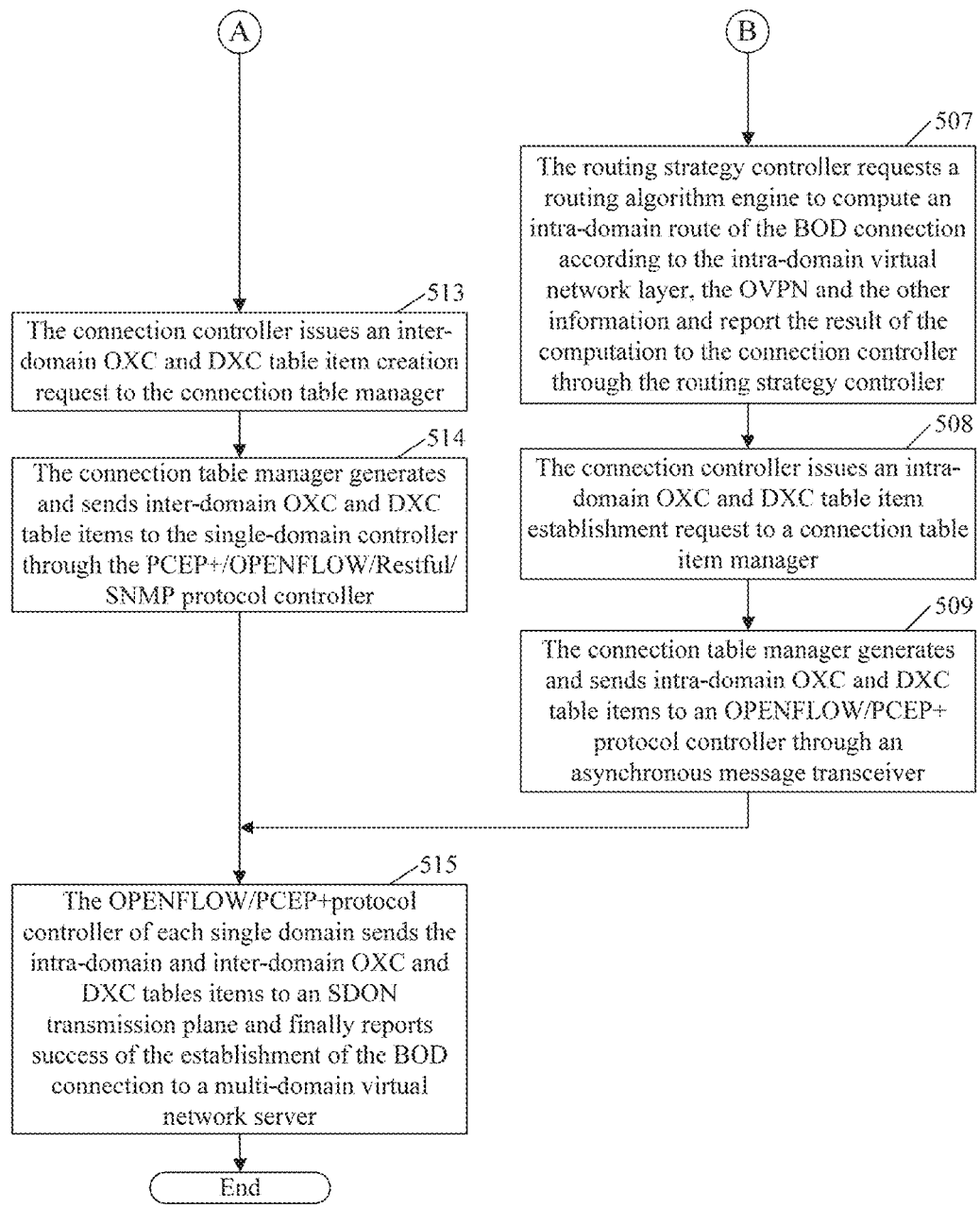

Scenario 3: in the SDON architecture system described herein, the establishment of a BOD service includes, as shown in FIG. 8, the following steps.

In Step 501, an application layer sends a BOD connection service establishment request to the multi-domain controller of an SDON.

In Step 502, the virtual network service manager of the multi-domain controller determines whether or not the request sent by the application layer is a cross-domain BOD connection request.

In Step 503, if it is determined in Step 502 that the request sent by the application layer is a cross-domain BOD connection request, then the virtual network service manager of the multi-domain controller divides the cross-domain BOD connection request into an inter-domain part to be processed and an intra-domain part to be processed, wherein each intra-domain part is sent to the single-domain controller of each SDON through the PCEP+/OPENFLOW/Restful/SNMP protocol controller of the multi-domain controller, and then the processing proceeds to Step 505; and for the inter-domain part, the processing directly proceeds to Step 510.

In Step 504, if it is determined in Step 502 that the BOD connection service establishment request is not a cross-domain request, then the request is issued to the single-domain controller of each SDON through the PCEP+/OPENFLOW/Restful/SNMP protocol controller of the multi-domain controller.

In Step 505, the internal virtual network service manager of the single-domain controller of each SDON sends a request for the establishment of a BOD connection in a single domain to a routing connection controller.

In Step 506, the routing connection controller sends, according to the intra-domain virtual network layer, the OVPN and the other information sent by the virtual network service manager, a request for the computation of an intra-domain path of the BOD connection to a routing strategy controller.

In Step 507, the routing strategy controller requests a routing algorithm engine to compute an intra-domain path of the BOD connection according to the intra-domain virtual network layer, the OVPN and the other information and report the result of the computation to a routing connection controller through a routing strategy controller.

In Step 508, the routing connection controller issues an intra-domain OXC and DXC item establishment request to a connection table manager.

In Step 509, a connection table manager generates intra-domain OXC and DXC items and sends the generated intra-domain OXC and DXC items to an OPENFLOW/PCEP+protocol controller through an asynchronous message transceiver, and then the processing proceeds to Step 515.

In Step 510, for a request for the inter-domain part of the cross-domain BOD connection, a request for the establishment of the inter-domain part of the BOD connection is sent to a cross-domain routing connection controller.

In Step 511, the routing connection controller sends, according to the cross-domain virtual network layer, the OVPN and the other information sent by the virtual network service manager, a BOD inter-domain routing computation request to the routing strategy controller.

In Step 512, the routing strategy controller requests a routing algorithm engine to compute a BOD inter-domain routing according to the cross-domain virtual network layer, the OVPN and the other information and report the result of the computation to the routing connection controller through a routing strategy controller.

In Step 513, the routing connection controller issues an inter-domain OXC and DXC item establishment request to the connection table manager.

In Step 514, the connection table manager generates inter-domain OXC and DXC items and sends the generated inter-domain OXC and DXC items to a single-domain controller through the PCEP+/OPENFLOW/Restful/SNMP protocol controller.

In Step 515, the OPENFLOW/PCEP+ controller of each single domain sends the intra-domain OXC and DXO items and the inter-domain OXC and DXC items of the BOD connection to an SDON transmission plane and finally reports the success of the establishment of the BOD connection to a multi-domain virtual network server.

Figure 9:
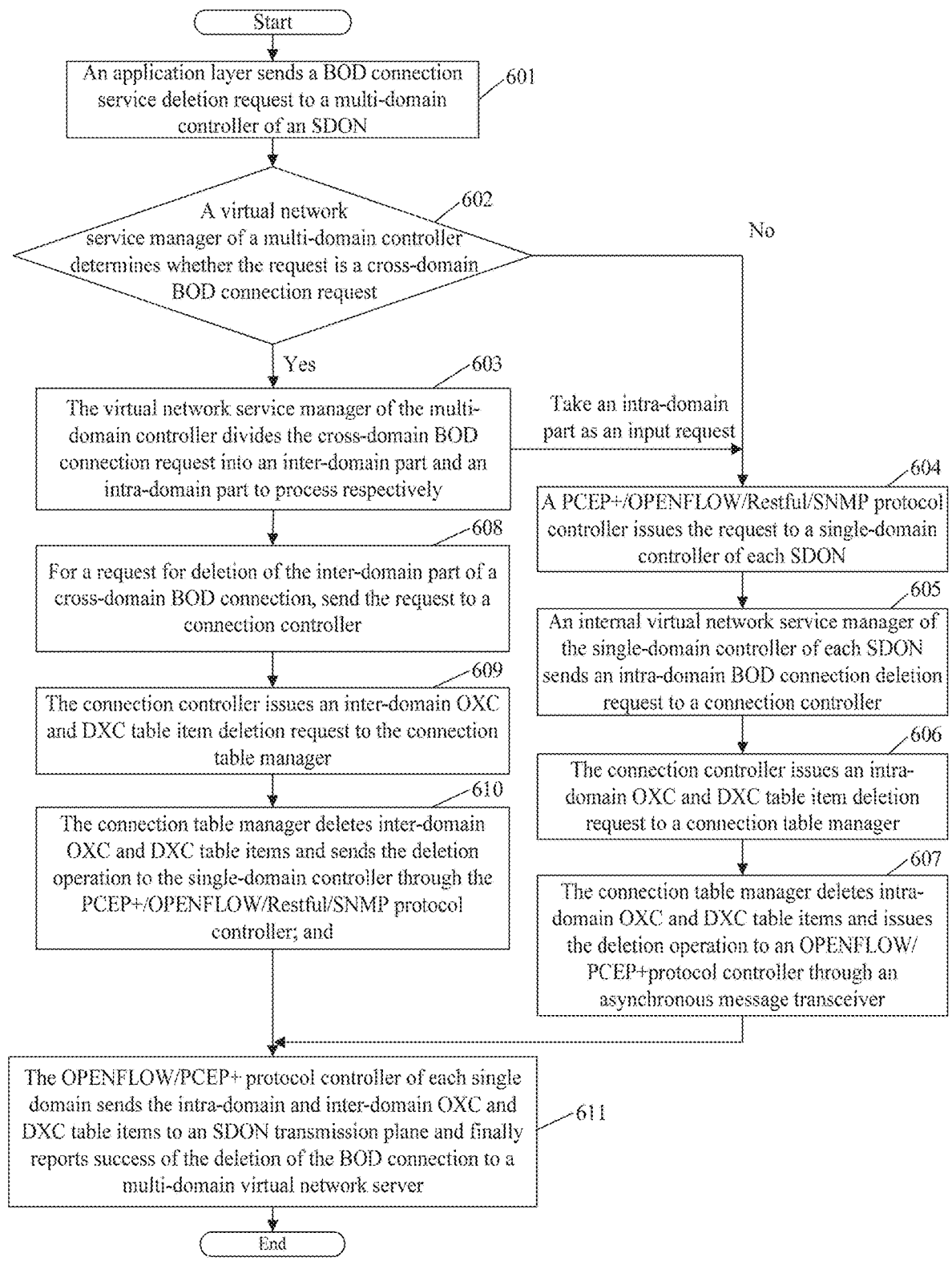
FIG. 9 is a flow chart illustrating the deletion of a BOD service according to the disclosure.

Scenario 4: in the SDON architecture system described herein, the deletion of a BOD service includes, as shown in FIG. 9, the following steps.

In Step 601, an application layer sends a BOD connection service deletion request to the multi-domain controller of an SDON.

In Step 602, the virtual network service manager of the multi-domain controller determines whether or not the request sent by the application layer is a cross-domain BOD connection request.

In Step 603, if it is determined in Step 602 that the request sent by the application layer is a cross-domain BOD connection request, the virtual network service manager of the multi-domain controller divides the cross-domain BOD connection request into an inter-domain part to be processed and an intra-domain part to be processed and then processes the two parts; for each intra-domain part, the request is sent to the single-domain controller of each SDON through the PCEP+/OPENFLOW/Restful/SNMP protocol controller of the multi-domain controller, and then the processing proceeds to Step 605; and for the inter-domain part, the processing directly proceeds to Step 608.

In Step 604, if it is determined in Step 602 that the BOD connection service establishment request is not a cross-domain BOD connection request, then the request is issued to the single-domain controller of each SDON by the PCEP+/OPENFLOW/Restful/SNMP protocol controller of the multi-domain controller.

In Step 605, the internal virtual network service manager of the single-domain controller of each SDON sends an intra-domain BOD connection deletion request to a routing connection controller.

In Step 606, the routing connection controller issues an intra-domain OXC and DXC item deletion request to a connection table manager.

In Step 607, the connection table manager deletes intra-domain OXC and DXC items and issues the deletion operation to an OPENFLOW/PCEP+ protocol controller through an asynchronous message transceiver, and then the processing proceeds to Step 611.

In Step 608, for a request for deletion of the inter-domain part of a cross-domain BOD connection, a request for the deletion of the inter-domain part of the BOD connection is sent to a cross-domain routing connection controller.

In Step 609, the routing connection controller issues an inter-domain OXC and DXC item deletion request to the connection table manager.

In Step 610, the connection table manager deletes inter-domain OXC and DXC items and sends the deletion operation to a single-domain controller through the PCEP+/OPENFLOW/Restful/SNMP protocol controller.

In Step 611, the OPENFLOW/PCEP+ protocol controller of each single domain sends the to-be-deleted intra-domain OXC and DXC items and the to-be-deleted inter-domain OXC and DXC items of the BOD connection to an SDON transmission plane and finally reports the success of the deletion of the BOD connection to a multi-domain virtual network server.

Figure 10:
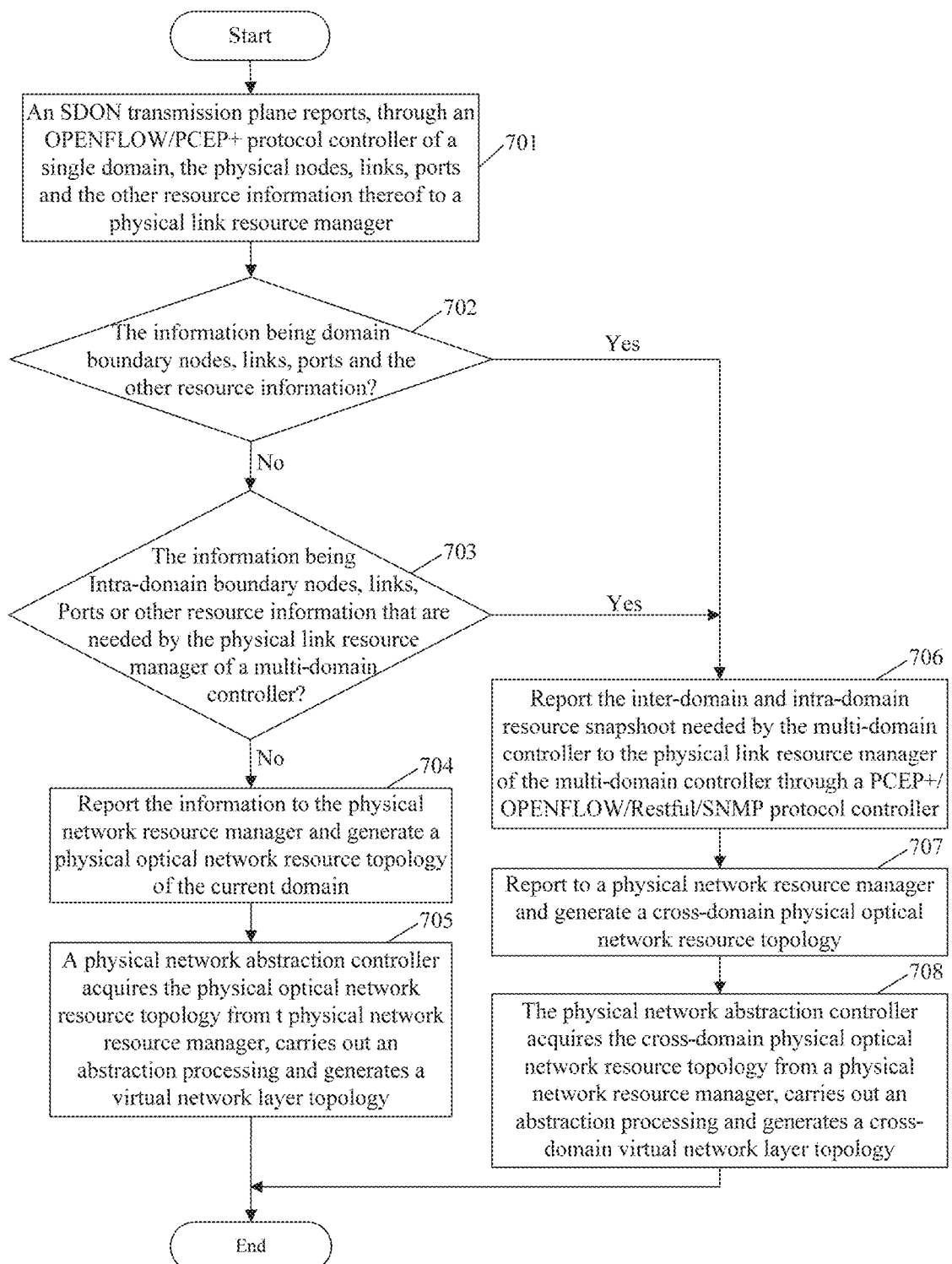
FIG. 10 is a flow chart illustrating the establishment of a virtual network layer topology according to the disclosure.

Scenario 5: in the SDON architecture system described herein, the establishment of a virtual network layer topology through abstraction includes, as shown in FIG. 10, the following steps.

In Step 701, an SDON transmission plane reports, through the OPENFLOW/PCEP+ protocol controller of a single domain, the physical nodes, links, ports and the other resource information thereof to a physical link resource manager.

In Step 702, the physical link resource manager of a single-domain controller determines whether or not the reported information is domain boundary nodes, links, ports or other domain boundary resources, if so, the processing directly proceeds to Step 706, otherwise, the processing proceeds to Step 703.

In Step 703, the physical link resource manager of a single-domain controller determines whether or not the reported information is intra-domain boundary nodes, links, ports or other intra-domain boundary resources that are needed by the physical link resource manager of a multi-domain controller, if so, the processing directly proceeds to Step 706, otherwise, the processing proceeds to Step 704.

In Step 704, the physical link resource manager of the single-domain controller reports the reported information to a physical network resource manager and generates the physical optical network resource topology of the current domain.

In Step 705, the physical network abstraction controller of a single domain acquires the physical optical network resource topology from a physical network resource manager, carries out an abstraction processing and generates a single-domain virtual network layer topology.

In Step 706, the inter-domain resource snapshoot and the intra-domain resource snapshoot needed by the multi-domain controller are reported to the physical link resource manager of the multi-domain controller through a PCEP+/OPENFLOW/Restful/SNMP protocol controller.

In Step 707, the physical link resource manager of the multi-domain controller reports the reported information to a physical network resource manager and generates a cross-domain physical optical network resource topology.

In Step 708, the physical network abstraction controller acquires the cross-domain physical optical network resource topology from a physical network resource manager, carries out an abstraction processing and generates a cross-domain virtual network layer topology.

Figure 11:
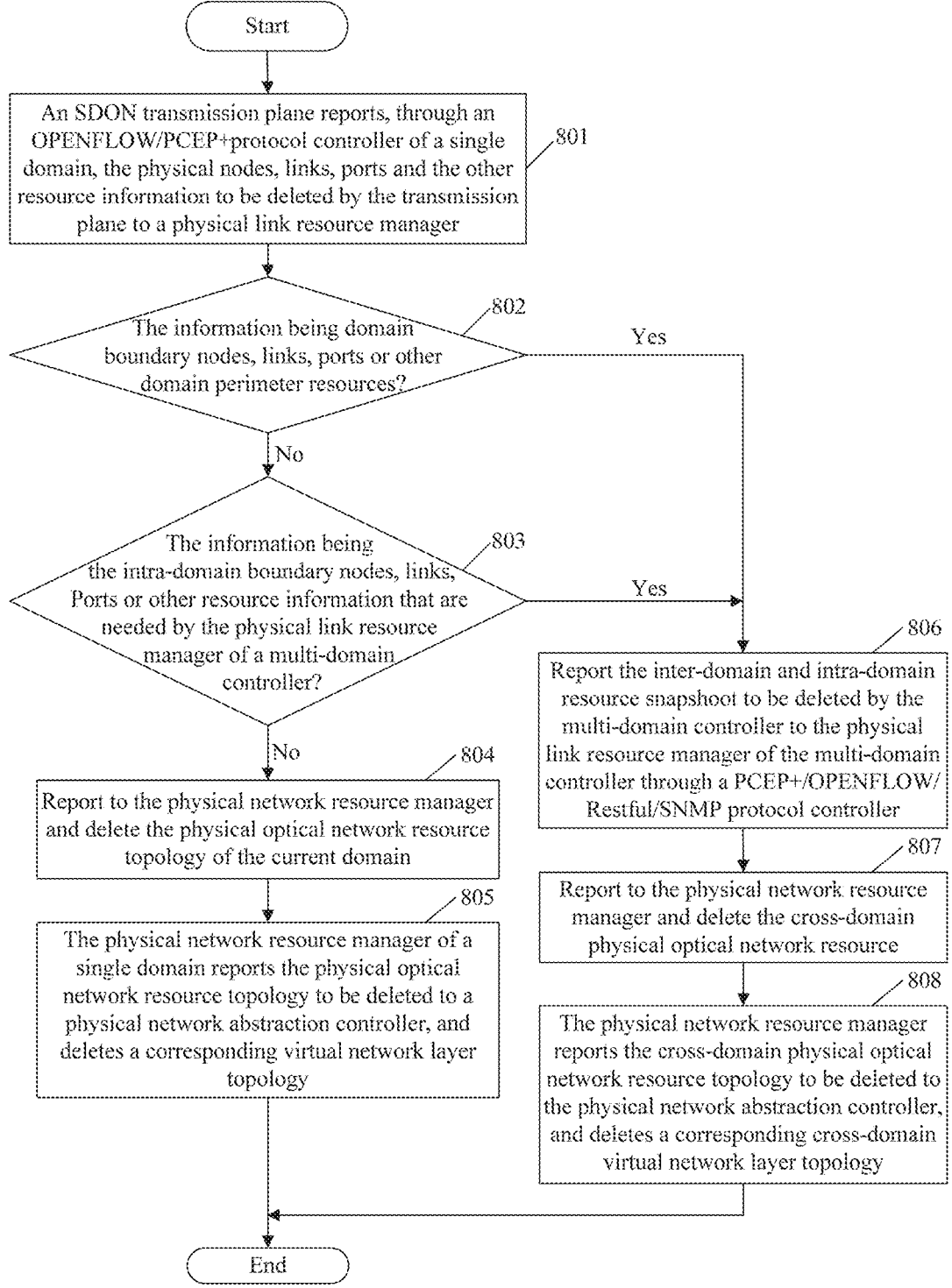
FIG. 11 is a flow chart illustrating the deletion of a virtual network layer topology according to the disclosure.

Scenario 6: in the SDON architecture system described herein, the deletion of a virtual network layer topology through abstraction includes, as shown in FIG. 11, the following steps. In Step 801, an SDON transmission plane reports, through the OPENFLOW/PCEP+ protocol controller of a single domain, the physical nodes, links, ports and the other resource information to be deleted by the transmission plane to a physical link resource manager.

In Step 802, the physical link resource manager of a single-domain controller determines whether or not the reported information is domain boundary nodes, links, ports or other domain boundary resources, if so, the processing directly proceeds to Step 806, otherwise, the processing proceeds to Step 803.

In Step 803, the physical link resource manager of a single-domain controller determines whether or not the reported information is the intra-domain boundary nodes, links, ports or other intra-domain boundary resources that are needed by the physical link resource manager of a multi-domain controller, if so, the processing directly proceeds to Step 806, otherwise, the processing proceeds to Step 804.

In Step 804, the physical link resource manager of the single-domain controller reports the reported information to a physical network resource manager and deletes the physical optical network resource topology of the current domain.

In Step 805, the physical network resource manager of a single domain reports the physical optical network resource topology to be deleted to a physical network abstraction controller, and deletes a corresponding virtual network layer topology.

In Step 806, the inter-domain resource snapshoot and the intra-domain resource snapshoot to be deleted by the multi-domain controller are reported to the physical link resource manager of the multi-domain controller through a PCEP+/OPENFLOW/Restful/SNMP protocol controller.

In Step 807, the physical link resource manager of the multi-domain controller reports the inter-domain resource snapshoot and the intra-domain resource snapshoot to be deleted to a physical network resource manager and deletes the cross-domain physical optical network resource.

In Step 808, the physical network resource manager reports the cross-domain physical optical network resource topology to be deleted to the physical network abstraction controller, and deletes a corresponding cross-domain virtual network layer topology.

The abbreviations involved herein are explained as follows:
BOD: Bandwidth On Demand
CDPI: Control Data Plane Interface
CVNI: Control Virtual Network Interface
DXC: Digital Cross Connect
IV: impairment Verification
KSP: K Shortest Paths K
MILP: Mixed Integer Linear Programming
OCH: Optical Channel
ODU: Optical Data Unit
OTN: Optical Transport Network: generally referring to any optical transmission network having ODUk, ODUFlex, OCH, a sub-wavelength-level switching capability, a lambda switching capability an so on
OVPN: Optical Virtual Private Network
OXC: Optical Cross Connect
PCEP+: Path Computation Element Protocol Extension
RWA: Routing and Wavelength Assignment
SDON: Software Defined Optical Network
VONS: Virtual Optical Network Service
VNE: Virtual Network Element These integrated modules described herein, when embodied as software function modules and sold or used as independent products, can be stored in a computer-readable memory medium. Based on the appreciation, the essence of technical solutions of the disclosure, or the contributive part of technical solutions of the disclosure compared with the conventional technology, can be embodied as software products which can be stored on a memory medium and which include a plurality of instructions to cause a computer device (e.g. a personal computer, a server, or a network device) to execute a part of or all the steps of the methods described herein. The foregoing computer memory medium may be a medium, for example, a USB flash disk, a mobile hard disk drive, a Read-Only Memory (ROM), a Random Access Memory (RAM), a diskette or a compact disc, which is capable of storing program codes. Therefore, embodiments of the disclosure are not limited to a combination of specific hardware and software.

The above is merely preferred embodiments of the disclosure but is not to be construed as limiting the scope of the disclosure.

INDUSTRIAL APPLICABILITY

A multi-domain controller provided herein at least includes: a virtual network service manager arranged to process a cross-domain or single-domain VONS request sent from an application layer and divide the cross-domain VONS request into an inter-domain part to be processed and an intra-domain part to be processed, the intra-domain part including multiple intra-single-domain parts, wherein the inter-domain part of the VONS request is processed by the multi-domain controller, wherein the multi-domain controller is arranged to: for a service request with a Bandwidth On Demand (BOD) connection attribute in the cross-domain VONS request, forward the service request with the BOD connection attribute to a routing connection controller, and for a service request with an Optical Virtual Private Network (OVPN) attribute in the cross-domain VONS request, perform OVPN service processing which includes establishment and deletion according to acquired virtual network layer resources; and wherein each of the intra-single-domain parts of the cross-domain VONS request is issued to each single-domain controller by the virtual network service manager of the multi-domain controller through a PCEP+/OPENFLOW/Restful/SNMP protocol controller. Embodiments of the disclosure at least address the existing problems by designing, in an SDON controller layer, an architecture system which, in addition to the functions of existing architecture system, is compatible with the VONS.

The invention claimed is:

1. A multi-domain controller, at least comprising: a virtual network service manager arranged to:
    process a cross-domain or single-domain Virtual Optical Network Service (VONS) request sent from an application layer and divide the cross-domain VONS request into an inter-domain part to be processed and an intra-domain part to be processed, the intra-domain part including multiple intra-single-domain parts;
    wherein the inter-domain part of the VONS request is processed by the multi-domain controller, wherein the multi-domain controller is arranged to: for a service request with a Bandwidth On Demand (BOD) connection attribute in the cross-domain VONS request, forward the service request with the BOD connection attribute to a routing connection controller, and for a service request with an Optical Virtual Private Network (OVPN) attribute in the cross-domain VONS request, perform OVPN service processing which includes establishment and deletion according to acquired virtual network layer resources; and
    wherein each of the intra-single-domain parts of the cross-domain VONS request is issued to each single-domain controller by the virtual network service manager of the multi-domain controller through a Path Computation Element Protocol (PCEP)+/OPENFLOW/Restful/Simple Network Management Protocol (SNMP) protocol controller;
    further comprising: a physical network abstraction controller arranged to:
    perform, in a cross-domain Software Defined Optical Network (SDON) transmission plane layer, logical abstraction processing on physical models including physical device nodes, elements and links of boundary optical network of each domain, to generate a cross-domain virtual network layer described in a form of a mathematic model including a mathematical formula or a software language; and
    create and maintain a topology of the cross-domain virtual network layer and a one-to-one mapping relationship between the topology of the cross-domain virtual network layer and the cross-domain physical network layer of the SDON transmission plane;
    further comprising: a virtual network mapping strategy controller and a virtual network mapping algorithm engine, wherein
    the virtual network mapping strategy controller is arranged to:
    construct the mathematic model of a mapping algorithm according to a virtual network mapping optimization strategy and send a mapping computation request to the virtual network mapping algorithm engine, acquire the mapping relationship between the inter-domain part of the OVPN service of the user and the cross-domain virtual network layer from a response from the virtual network mapping algorithm engine, and finally transmit the acquired mapping relationship to the virtual network service manager; and
    the virtual network mapping algorithm engine is arranged to:
    realize, according to the virtual network mapping strategy, an algorithm for establishing the mapping relationship between the inter-domain part of the cross-domain OVPN service and the cross-domain virtual network layer.

2. The multi-domain controller according to claim 1 wherein the virtual network service manager is further arranged to:
    for the inter-domain part request of the cross-domain OVPN service, acquire a mapping relationship between an OVPN and a cross-domain virtual network layer from a virtual network mapping strategy controller:
    assign cross-domain physical network resources for running of the intra-part of the cross-domain OVPN service to the inter-domain part of the cross-domain OVPN service through the cross-domain virtual network layer.

3. The multi-domain controller according to claim 2, wherein the virtual network service manager is further arranged to:
    record and store OVPN service information of each user and a connection service, including a cross-domain BOD, that is established by the user on the OVPN service or a connection service, including the cross-domain BOD, that is directly established by the user in the cross-domain virtual network layer, and
    record and store the mapping relationship between the OVPN of each user and the cross-domain virtual network layer.

4. The multi-domain controller according to claim 3, wherein the virtual network service manager is further arranged to:
    acquire the resources of the cross-domain virtual network layer from a physical network abstraction controller in real time and acquire a mapping relationship between the cross-domain virtual network layer and a cross-domain physical network.

5. The multi-domain controller according to claim 1, wherein the virtual network mapping strategy controller is further arranged such that:
    a network mapping strategy for the inter-domain part of the cross-domain OVPN service and the cross-domain virtual network layer is determined through issuing by an application layer user, or is determined by the virtual network service manager according to a current load state of a cross-domain physical optical network of an SDON transmission plane layer.

6. The multi-domain controller according to claim 5, wherein the virtual network mapping strategy controller is further arranged to:
    record a virtual network mapping optimization strategy which includes:
    at least one of minimal physical resource utilization cost, most mapped OVPNs, load balancing and maximum revenue, or
    formulating a mapping strategy including resource convergence and resource partitioning according to a usage demand of the user.

7. The multi-domain controller according to claim 6, further comprising: a routing strategy controller and a routing algorithm engine, wherein the routing strategy controller is arranged to:
take charge of managing and controlling a constraint strategy and an optimization strategy for computing an inter-domain path of a service connection including the cross-domain BOD; and
the routing algorithm engine is arranged to provide a Routing and Wavelength Assignment+Impairment Verification (RWA+IV) path computing function for the inter-domain path of the service connection including the cross-domain BOD.

8. The multi-domain controller according to claim 7, further comprising: a routing connection controller and a connection table manager, wherein the routing connection controller is arranged to replace an Label Distribution Protocol (LDP)/Resource Reservation Protocol-Traffic Engineering (RSVP-TE) module of a former Multi-protocol Label Switching-Traffic Engineering (MPLS-TE)/Generalized Multiprotocol Label Switching (GMPLS) distributed control plane to implement control, including creation, deletion, attribute modification and query, of the inter-domain part of the service connection including the cross-domain BOD, the control mainly involving generation and configuration operations on each Optical Cross Connect (OXC)/Digital Cross Connect (DXC) node table item included in the inter-domain part of each service connection including the BOD, and perform protection recovery mechanism control on the inter-domain part of each service connection including the BOD; and
the connection table manager is arranged to generate a corresponding OpenFlow item according to the OXC/DXC node cross configuration generated by the routing connection controller for the inter-domain part of each service connection including the BOD, transmit the generated OpenFlow table item to the single-domain controller of each SDON through an asynchronous message transceiver, and finally issue the generated OpenFlow table item to a domain boundary device node of the cross-domain SDON transmission plane using the single-domain controller of each SDON.

9. The multi-domain controller according to claim 8, further comprising: a physical link resource manager and a physical network resource manager, wherein the physical link resource manager is arranged to take charge of collecting information including physical links, nodes and ports reported by the domain boundary device node of the cross-domain SDON transmission plane and send the collected information to the physical network resource manager; and
the physical network resource manager is arranged to receive information including domain boundary links, nodes and ports sent by the physical link resource manager, and establish, maintain and record topology information of cross-domain physical optical network resources, wherein the maintaining the topology information of the cross-domain optical network includes adding, deleting, querying and modifying topology resources of the cross-domain optical network and identifying a fault.

10. The multi-domain controller according to claim 9, further comprising: an asynchronous message transceiver and a PCEP+/OPENFLOW/Restful/SNMP protocol controller, wherein the asynchronous message transceiver is arranged to take charge of caching and transmitting and receiving an asynchronous message communicated between the multi-domain controller and the each single-domain controller; and
the PCEP+/OPENFLOW/Restful/SNMP protocol controller is arranged to take charge of protocol message exchange between the multi-domain controller and the each single-domain controller and between the multi-domain controller and the application layer user.

11. A single-domain controller, at least comprising: a virtual network service manager arranged to:

process a Virtual Optical Network Service (VONS) request in a current domain which is sent from a multi-domain controller, wherein for a service request with a Bandwidth On Demand (BOD) connection attribute in the VONS request in the current domain, the virtual network service manager is arranged to forward the service request with the BOD connection attribute to a routing connection controller, and for a service request with an Optical Virtual Private Network (OVPN) attribute in the VONS request in the current domain, perform OVPN service processing, which includes establishment and deletion, according to acquired virtual network layer resources;
further comprising: a physical network abstraction controller arranged to:
perform, in the Software Defined Optical Network (SDON) transmission plane layer of the current domain, logical abstraction processing on physical models including physical device nodes, elements and links of each optical network to generate a virtual network layer described in a form of a mathematic model including a mathematical formula or a software language; and
create and maintain a topology of the virtual network layer of the current domain and a one-to-one mapping relationship between the virtual network layer of the current domain and a physical network layer of the SDON transmission plane of the current domain;
further comprising: a virtual network mapping strategy controller and a virtual network mapping algorithm engine, wherein
the virtual network mapping strategy controller is arranged to:
construct the mathematic model of a mapping algorithm according to a virtual network mapping optimization strategy, send a mapping computation request to the virtual network mapping algorithm engine, acquire the mapping relationship between the OVPN service of the user and the virtual network layer of the current domain from a response from the virtual network mapping algorithm engine, and finally transmit the acquired mapping relationship to the virtual network service manager; and
the virtual network mapping algorithm engine is arranged to:
realize, according to the virtual network mapping strategy, an algorithm for establishing the mapping relationship between the OVPN service and the virtual network layer of the current domain.

12. The single-domain controller according to claim, 11 wherein the virtual network service manager is further arranged to:

acquire, according to the OVPN service request in the current domain which is sent from the multi-domain controller, a mapping relationship between the OVPN and a virtual network layer of the current domain from a virtual network mapping controller; and assign physical network resources of the current domain for running of the OVPN through the virtual network layer.

13. The single-domain controller according to claim 12, wherein the virtual network service manager is further arranged to:

record and store OVPN service information of each user and a connection service, including the BOD of the current domain, that is created by the user on the OVPN service or a connection service, including the BOD of the current domain, that is directly created by the user in the virtual network layer, and record and store the mapping relationship between the OVPN of each user and the virtual network layer of the current domain.

14. The single-domain controller according to claim 12, wherein the virtual network service manager is further arranged to:

acquire the resources of the virtual network layer of the current domain from a physical network abstraction controller in real time and acquire the mapping relationship between the virtual network layer of the current domain and the physical network of the current domain.

15. The single-domain controller according to claim 11, wherein the virtual network mapping strategy controller is further arranged such that:

determine a network mapping strategy for the OVPN service and the virtual network layer of the current domain is determined through issuing by an application layer user, or is determined by the virtual network service manager according to a current load state of the physical optical network of the SDON transmission plane layer of the current domain.

16. The single-domain controller according to claim 15, wherein the virtual network mapping strategy controller is further arranged to:

record a virtual network mapping optimization strategy which includes:

at least one of minimal physical resource utilization cost, most mapped OVPNs, load balancing and maximum revenue, or formulating a mapping strategy including resource convergence and resource partitioning according to a usage demand of the user.

17. The single-domain controller according to claim 16, further comprising: a routing strategy controller and a routing algorithm engine, wherein the routing strategy controller is arranged to: take charge of managing and controlling a constraint strategy i:md an optimization strategy for computing a path of the service connection including the BOD in the current domain; and the routing algorithm engine is arranged to: determine a Routing and Wavelength Assignment+Impairment Verification (RWA+IV) path computing function for the service connection including the BOD in the current domain.

18. The single-domain controller according to claim 17, further comprising: a routing connection controller and a connection table manager, wherein the routing connection controller is arranged to:

replace an Label Distribution Protocol (LDP)/Resource Reservation Protocol-Traffic Engineering (RSVP-TE) module of a former Multi-protocol Label Switching-Traffic Engineering (MPLS-TE)/Generalized Multiprotocol Label Switching (GMPLS) distributed control plane to implement control, including creation, deletion, attribute modification and query, of the service connection including an end-to-end BOD in the current domain or a part of the service connection including a multi-domain BOD in the current domain, the control mainly involving configuration operations on each Optical Cross Connect (OXC)/Digital Cross Connect (DXC) node table item included in each service connection including the BOD; and perform protection recovery mechanism control on each service connection including the BOD: and the connection table manager is arranged to generate a corresponding OpenFlow item according to the OXC/DXC node cross configuration of each service connection including a BOD that is generated by the routing connection controller and transmit the generated OpenFlow item to a device node of the SDON transmission plane through an asynchronous message transceiver.

19. The single-domain controller according to claim 18, further comprising: a physical link resource manager and a physical network resource manager, wherein the physical link resource manager is arranged to take charge of collecting information including physical links, nodes and ports reported by the device node of the SDON transmission plane and send the collected information to the physical network resource manager; and the physical network resource manager is arranged to receive the information including physical links, nodes and ports sent by the physical link resource manager and establish, maintain and record topology information of physical optical network resources of the current domain, wherein the maintaining the topology information of the optical network includes adding, deleting, querying and modifying the topology resources of the optical network and identifying a fault.

20. The single-domain controller according to claim 19, further comprising: an asynchronous message transceiver, a Path Computation Element Protocol (PCEP)+/OPENFLOW/Restful/Simple Network Management Protocol (SNMP) protocol controller and an OPENFLOW/PCEP+ protocol controller, wherein the asynchronous message transceiver is arranged to take charge of caching and transmitting and receiving an asynchronous message communicated between the single-domain controller and a device node of the SDON transmission plane:

the PCEP+/OPENFLOW/Restful/SNMP protocol controller is arranged to take charge of protocol message exchange between the multi-domain controller and the single-domain controller; and the OPENFLOW/PCEP+ protocol controller is arranged to take charge of control and communication of a PCEP extension/OPENFLOW protocol used between the single-domain controller and the device node of the SDON transmission plane, establish and maintain a connection session and protocol message transfer between the controller and an Optical Transport Network (OTN) device node, and perform a security processing on a message communicated between the controller and the OTN physical node.

* * * * *